United States Patent
Jin et al.

(10) Patent No.: US 12,418,764 B2
(45) Date of Patent: Sep. 16, 2025

(54) MULTI-CHANNEL AEC SYSTEM IDENTIFICATION FOR SELF-CALIBRATION

(71) Applicant: Sonos, Inc., Santa Barbara, CA (US)

(72) Inventors: Wenyu Jin, Eden Prairie, MN (US); Patrick Kevin McPherson, Somerville, MA (US); Adib Mehrabi, London (GB)

(73) Assignee: Sonos, Inc., Goleta, CA (US)

( * ) Notice: Subject to any disclaimer, the term of this patent is extended or adjusted under 35 U.S.C. 154(b) by 85 days.

(21) Appl. No.: 18/474,909

(22) Filed: Sep. 26, 2023

(65) Prior Publication Data

US 2024/0121568 A1 Apr. 11, 2024

Related U.S. Application Data

(60) Provisional application No. 63/377,485, filed on Sep. 28, 2022.

(51) Int. Cl.
  *H04S 7/00* (2006.01)
  *H04M 9/08* (2006.01)
(52) U.S. Cl.
  CPC ............. *H04S 7/301* (2013.01); *H04M 9/082* (2013.01); *H04S 7/305* (2013.01)
(58) Field of Classification Search
  CPC .......... H04S 7/301; H04S 7/305; H04S 7/302; H04S 7/00; H04M 9/082; H04M 9/08; H04R 3/02
  USPC ....................................................... 381/303
  See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |

(Continued)

FOREIGN PATENT DOCUMENTS

| | | | | |
|---|---|---|---|---|
| EP | 1389853 | * | 8/2002 | ............. H04L 12/28 |
| EP | 1389853 | A1 | 2/2004 | |
| WO | 200153994 | | 7/2001 | |
| WO | 2003093950 | A2 | 11/2003 | |

OTHER PUBLICATIONS

AudioTron Quick Start Guide, Version 1.0, Mar. 2001, 24 pages.

(Continued)

*Primary Examiner* — Yosef K Laekemariam
(74) *Attorney, Agent, or Firm* — Fortem IP LLP

(57) ABSTRACT

Examples described herein relate to calibration of audio playback devices in a media playback system using inputs derived from a multi-channel adaptive filter of an acoustic echo canceller. Example playback devices described herein may utilize one or more techniques for calibration, which may be implemented as various calibration procedures. In some implementations, an example playback device may implement a self-calibration procedure, which involves the playback device calibrating (or re-calibrating) itself during operation. Yet further, the playback device may estimate acoustic impulse responses from a multi-channel adaptive filter of an acoustic echo canceller to use as inputs to the self-calibration procedure.

20 Claims, 18 Drawing Sheets

(56) References Cited

U.S. PATENT DOCUMENTS

| | | |
|---|---|---|
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1* | 2/2002 | Lipscomb .......... H04N 21/4788 |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

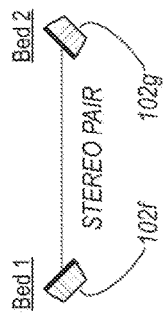
*Fig. 3B*
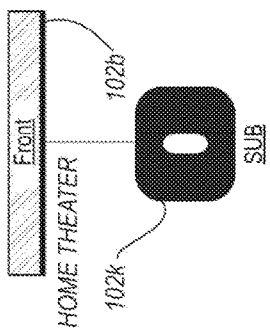
*Fig. 3C*
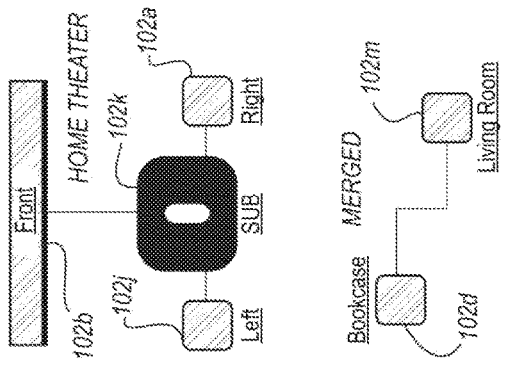
*Fig. 3D*
*Fig. 3E*
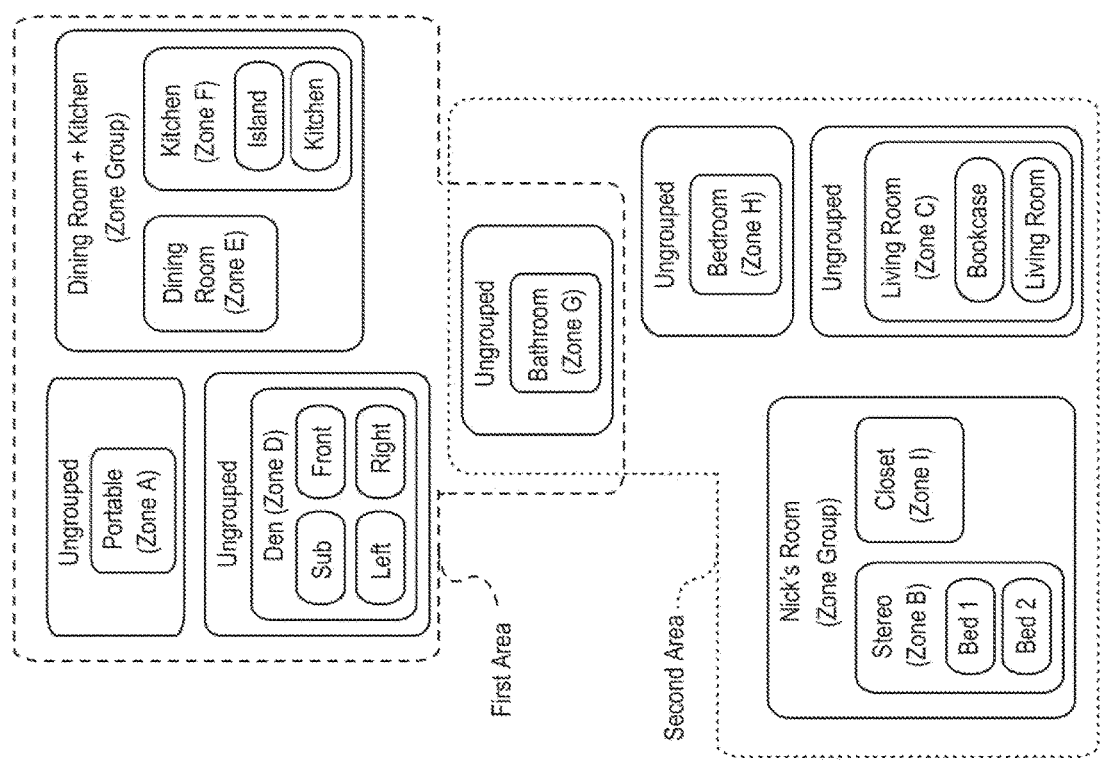
*Fig. 3A*

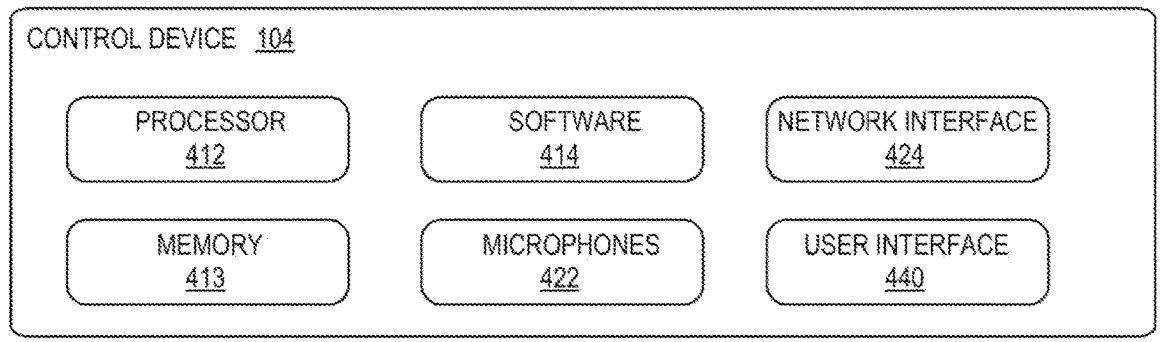
Fig. 4
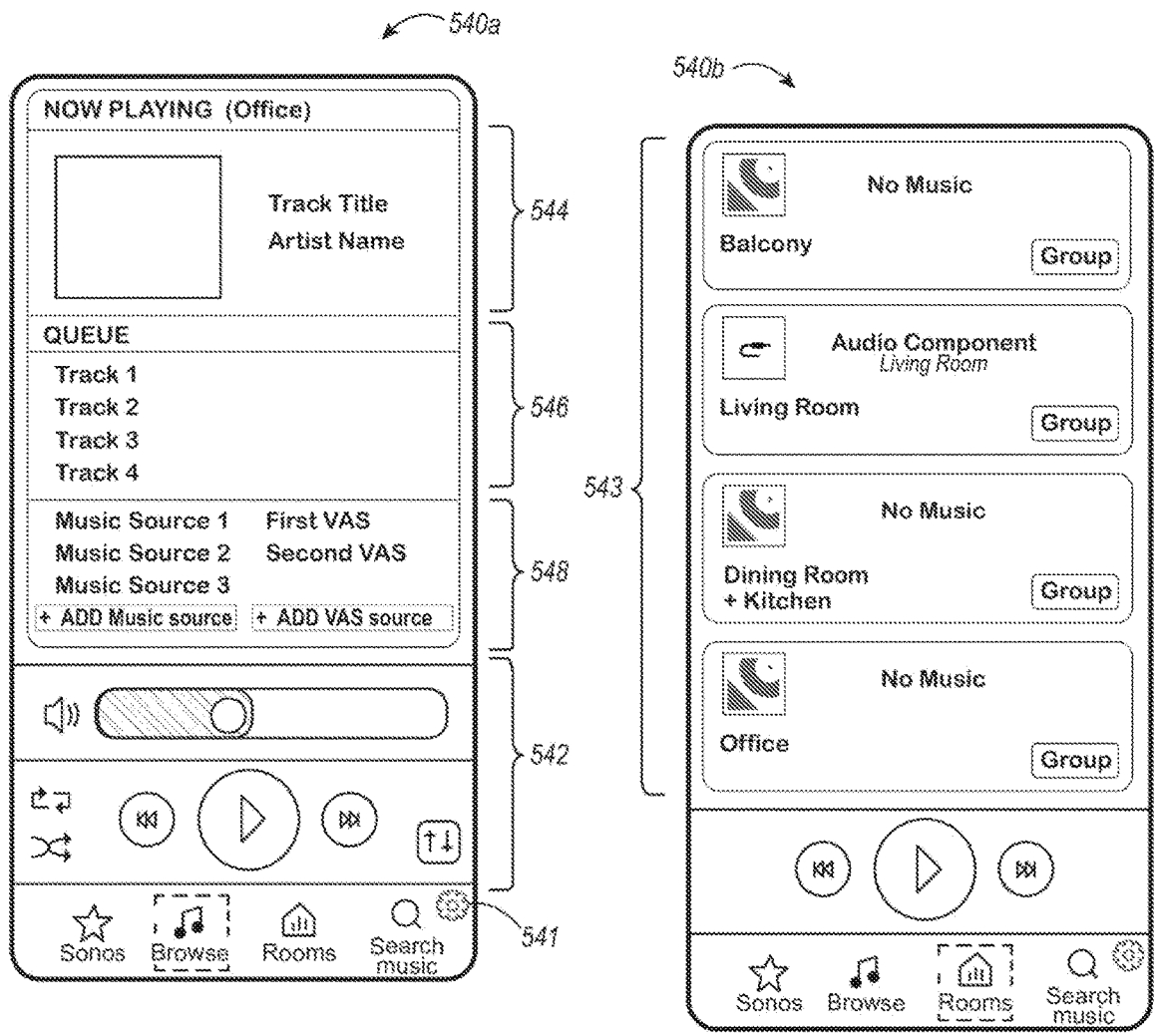
Fig. 5A
Fig. 5B

MULTI-CHANNEL AEC SYSTEM IDENTIFICATION FOR SELF-CALIBRATION

CROSS-REFERENCE TO RELATED APPLICATION

This application claims the benefit of priority to U.S. Patent Application No. 63/377,485, filed Sep. 28, 2022, which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 3A, 3B, 3C, 3D and 3E are diagrams showing example playback device configurations in accordance with aspects of the disclosure.

FIG. 4 is a functional block diagram of an example controller device in accordance with aspects of the disclosure.

FIGS. 5A and 5B are controller interfaces in accordance with aspects of the disclosure.

Figure 1A:
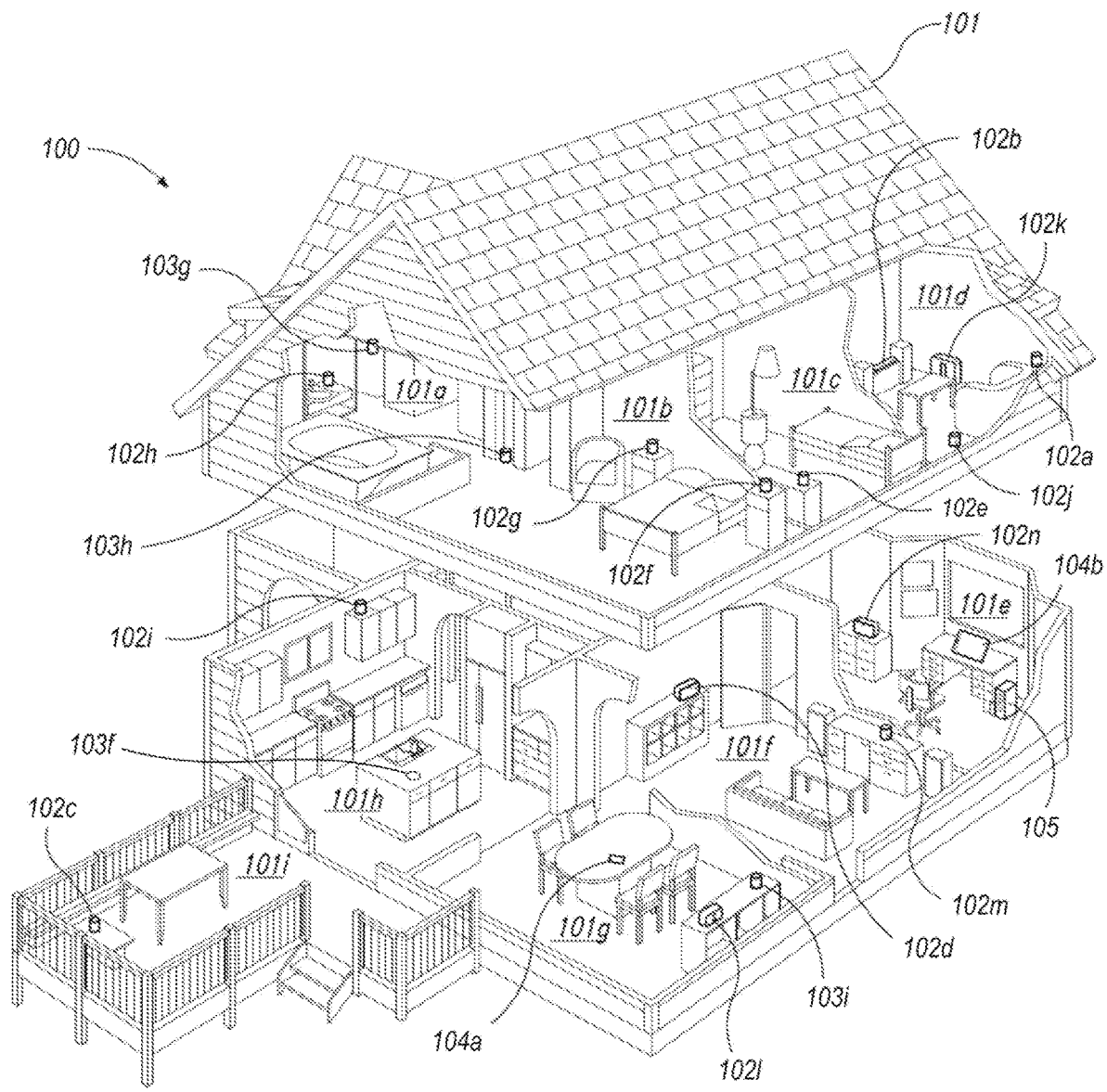
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

DETAILED DESCRIPTION

I. Overview

Examples described herein relate to calibration of audio playback devices in a media playback system using inputs derived from a multi-channel adaptive filter of an acoustic echo canceller. Example playback devices described herein may utilize one or more techniques for calibration, which may be implemented as various calibration procedures. In some implementations, an example playback device may implement a self-calibration procedure, which involves the playback device calibrating (or re-calibrating) itself during operation. Yet further, the playback device may estimate acoustic impulse responses from a multi-channel adaptive filter of an acoustic echo canceller to use as inputs to the self-calibration procedure.

In an example self-calibration procedure, a playback device captures a representation of its playback using its microphones during playback. The playback device determines an acoustic response (e.g., an impulse response) based on the captured playback. The playback device may then determine a spectral correction based on the determined acoustic response.

For instance, the playback device may determine a spectral correction using a transfer function that maps a self-impulse response to a spectral correction. The transfer function may be based on a machine learning algorithm that has been trained on a large number of manual spectral calibration iterations in different listening areas. Additional details regarding self-calibration can be found, for example, in U.S. Pat. No. 9,763,018, titled "Calibration of Audio Playback Devices," U.S. Pat. No. 10,299,061, titled "Playback Device Calibration," and U.S. Pat. No. 10,734,965, titled "Audio Calibration of a Portable Playback Device," which are each incorporated by reference in their entirety.

Example playback devices may further implement a network microphone device for voice input and control. A network microphone device may, in operation, capture voice data via one or more microphones and apply pre-processing to condition the voice data into a voice input. After such pre-processing, the voice input represented in the voice data is provided to a voice assistant (e.g., such as a cloud-based or local voice assistant) for processing. Additional details regarding voice input processing can be found, for example, in U.S. Pat. No. 10,466,962, titled "Media Playback System with Voice Assistance" and U.S. Pat. No. 10,586,540, titled "Network Microphone Device With Command Keyword Conditioning," which are each incorporated by reference in their entirety.

When a playback device is playing audio in the same acoustic environment as a networked microphone device, sound captured by the microphone(s) of the networked microphone device typically includes the sound of the audio playback as well as any uttered voice inputs. Since the sound of the audio playback might interfere with processing of a voice input by a voice assistant service (e.g., if the audio playback drowns out the voice input), an acoustic echo canceller ("AEC") may be used to remove the sound of the audio playback (i.e., the echo) from the signal captured by microphone(s) of the networked microphone device. This cancellation is intended to improve the signal-to-noise ratio of the voice input to other sound within the acoustic environment so as to provide a less noisy input to the voice assistant.

In some example implementations, an AEC is implemented within the audio processing pipeline of an example playback device. Within examples, the AEC may implement an adaptive acoustic echo cancellation algorithm in the short-time Fourier transform (STFT) domain. Inputs to such an example AEC may include the signal captured by the microphone(s) of a networked microphone device and a reference signal. To represent the audio playback as closely as practical, the reference signal may be taken from a point in the audio playback pipeline that closely represents the analog audio expected to be output by the transducers.

After conversion of these inputs to the STFT domain, the example AEC attempts to find a transfer function (i.e., a 'filter') that transforms the reference signal into the captured microphone signal with minimal error. Inverting the resulting AEC output and mixing it with the microphone signal causes a redaction of the audio output signal from the signal captured by the microphone(s). Error in each iteration of the AEC is used to adapt the filter for a subsequent iteration.

Moreover, in example implementations, example AEC may utilize robust adaptive acoustic echo cancellation techniques to enable convergence in the presence of noise (e.g., a voice input). Robust adaptive acoustic echo cancellation may include error recovery non-linearity, whereby a non-linear function, such as a clipping function, is applied to the error signal to limit the error when its magnitude is above a certain threshold. Yet further, the step-size (i.e., how much the filters adapt during each iteration) may vary based on whether noise is present (i.e., to avoid divergence, the AEC may adapt more slowly in the presence of noise and more quickly when noise is not present). Additional details regarding robust adaptive acoustic echo cancellation can be found, for example, in U.S. Pat. No. 10,446,165, titled "Robust Short-Time Fourier Transform Acoustic Echo Cancellation During Audio Playback" and U.S. Pat. No. 10,482,868, titled "Multi-Channel Acoustic Echo Cancellation," which are each incorporated by reference in their entirety.

One aspect of audio calibration is determining acoustic characteristics of the environment so that these acoustic characteristics can be offset (or at least partially mitigated) via calibration. As part of example acoustic echo cancellation processes, example acoustic echo cancellers determine the acoustic characteristics of the environment. The echo captured by the microphones represents both the playback and the acoustic characteristics of the environment. Through adaptation, the adaptive filter converges to represent the system (e.g., in the form of an impulse response).

Some example playback devices may include multiple transducers or may be grouped with one or more additional playback devices (e.g., into a stereo pair or surround sound configuration), which may output multiple channels of audio during playback. Accordingly, example AECs may implement multi-channel acoustic echo cancellation using a multi-channel adaptive filter matrix. One issue with multi-channel acoustic echo cancellation is that the reference channels are often highly correlated, which creates a non-uniqueness problem that may impair acoustic echo cancellation.

To mitigate this effect, example acoustic echo cancellation techniques may decorrelate the reference signals prior to performing acoustic echo cancellation. For example, a transformation may be applied to the reference signals to decorrelate them. In particular, an orthogonalization transformation to the reference channels in the time domain can result in independent and parallel filters in the frequency domain (e.g., the STFT domain). Within examples, singular value decomposition is performed on a first portion of the reference signal to obtain a unitary transformation matrix. Additional details regarding robust STFT domain multi-channel acoustic echo cancellation can be found, for example, in U.S. Pat. No. 10,482,868, titled "Multi-Channel Acoustic Echo Cancellation," which was previously incorporated by reference in its entirety.

While such techniques may effectively decorrelate the reference signals and facilitate multi-channel acoustic echo cancellation, such techniques may interfere with system identification. That is, since the multi-channel adaptive filter matrix is based on the reference signals, decorrelation of the reference signals results in the multi-channel adaptive filter matrix not representing the actual impulse responses, but rather equivalents. These equivalents cannot be used directly in self-calibration since they do not represent the actual impulse responses.

Example techniques described herein may involve estimating driver channel responses in the time domain from the equivalent multi-channel adaptive filter matrix. For instance, assuming a unitary transformation matrix, the actual acoustic response matrix is the product of the equivalent multi-channel adaptive filter matrix and the Kronecker product of the unitary transformation matrix and an identity matrix. Then, after the actual acoustic response matrix is determined, estimated driver channel responses can be generated by feeding a delta signal to the actual acoustic response matrix.

Yet further, some example self-calibration procedures may involve frequent (e.g., periodic) re-calibration, which may facilitate adaption to position changes of the playback device and/or environmental changes. Accordingly, as the equivalent multi-channel adaptive filter matrices adapts over time, the playback device may likewise update the estimates of the driver channel responses based on updated actual acoustic response matrices. However, the equivalent multi-channel adaptive filter matrices are based on changing reference signals, which do not always result in filters that are useful in system identification.

In particular, if the reference signals are highly correlated, the orthogonalization transformation might not fully mitigate the effects of correlation. As such, the playback device may refrain from updating the estimates of the driver channel responses when the reference signals are highly correlated. For instance, if the reference signal averaged coherence value is larger than a threshold at time frame i, then the playback device may forgo updating the estimates of the driver channel responses at the time frame i. Conversely, if the reference signal averaged coherence value is smaller than the threshold at time frame i, then the playback device may update the estimates of the driver channel responses at the time frame i.

In order to directly use the estimated driver channel responses as inputs to certain example self-calibration procedures, the playback device may perform some signal conditioning on the estimated driver channel responses. For instance, an example self-calibration procedure may expect 1/9 octave smoothed spectral coefficients of echo path responses. In such an example, after estimating driver channel responses, the playback device may apply octave smoothing to condition the estimated driver channel responses to the form expected by the example self-calibration procedure.

As noted above, example techniques relate to multi-channel system identification for self-calibration. An example involves a system comprising a playback device. The playback device comprises audio transducers, microphones, a housing carrying the audio transducers, the microphones, the at least one processor, and data storage including instructions that are executable by the at least one processor such that the playback device is configured to: play back respective audio signals via audio transducers in a given environment; during playback of the respective audio signals, capture, via microphones, respective microphone input streams; determining, via singular value decomposition, a unitary transformation matrix for the respective audio signals; determine a reference signal matrix comprising reference signals representing the respective audio signals in a short-time Fourier transform (STFT) domain; transform, via the determined unitary transformation matrix, the reference signal matrix to at least partially decorrelate the respective audio signals; determine a measured signal matrix comprising measured signals representing the microphone input streams in the STFT domain; cancel, via a multi-channel adaptive filter matrix of a multi-channel acoustic echo canceller, at least a portion of the reference signals from the corresponding measured signals; determine an impulse response matrix as the product of (i) the multi-channel adaptive filter matrix and (ii) a Kronecker product of the unitary transform matrix and an identity matrix; estimate echo path responses based on the determined impulse response matrix; determine a calibration that at least partially offsets acoustic characteristics of the given environment as represented by the estimated echo path responses; and apply the determined calibration to a playback device.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
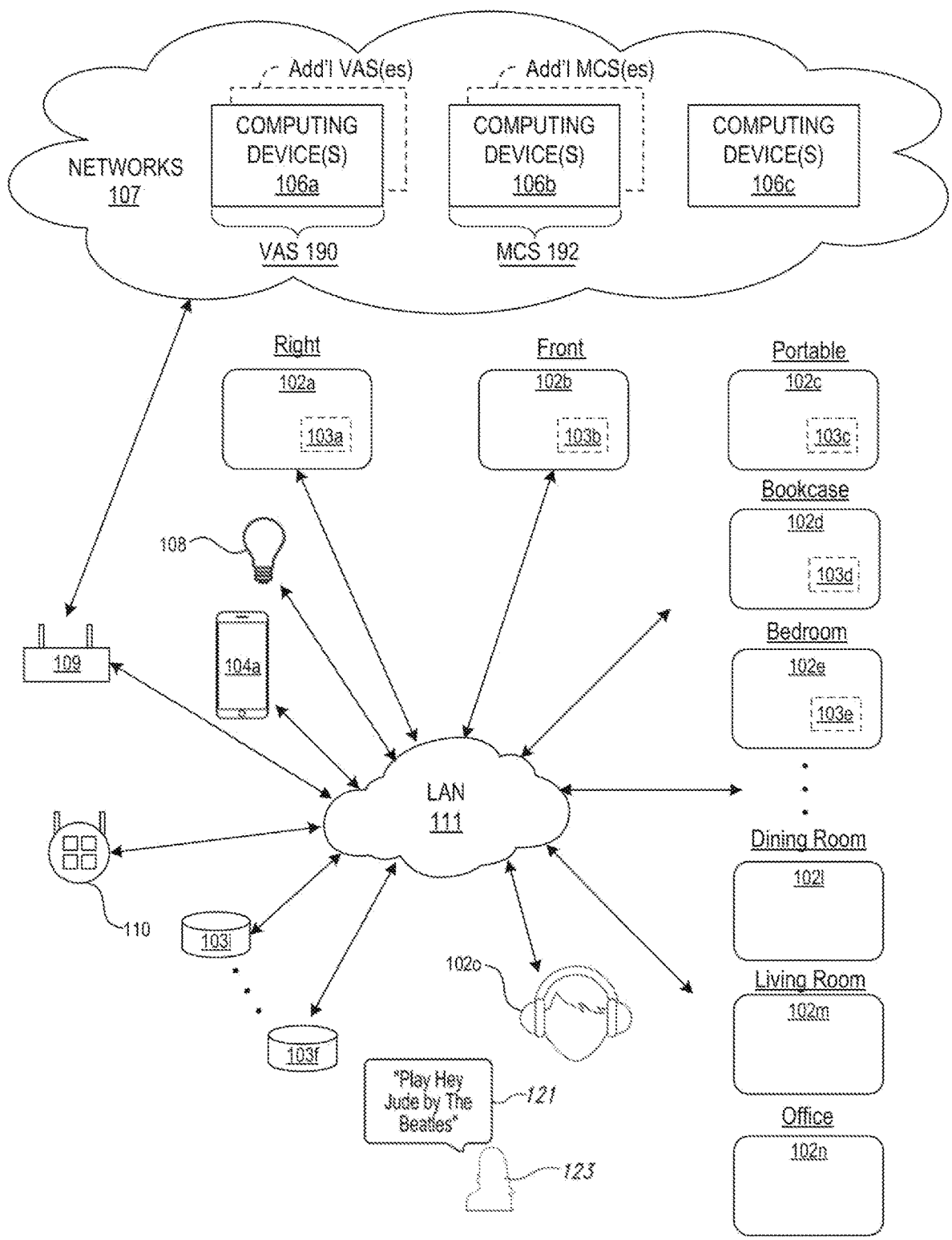
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b, (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-103i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A).

In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-e* include or are otherwise equipped with corresponding NMDs 103*a-e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-d. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
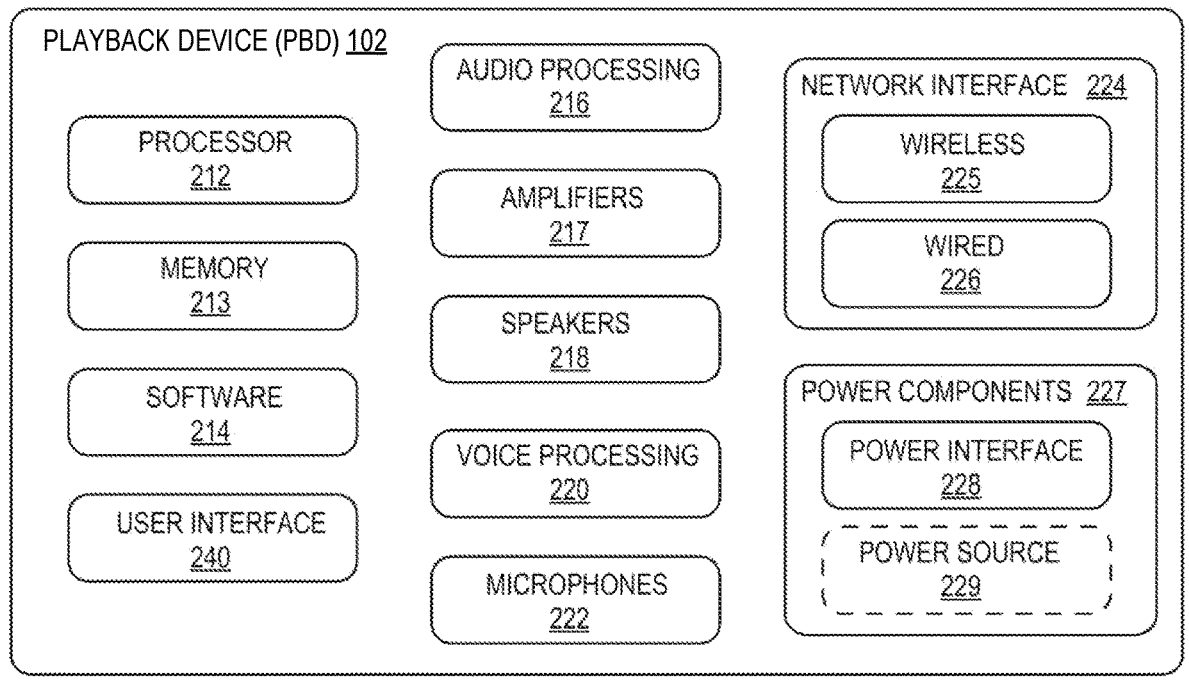
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
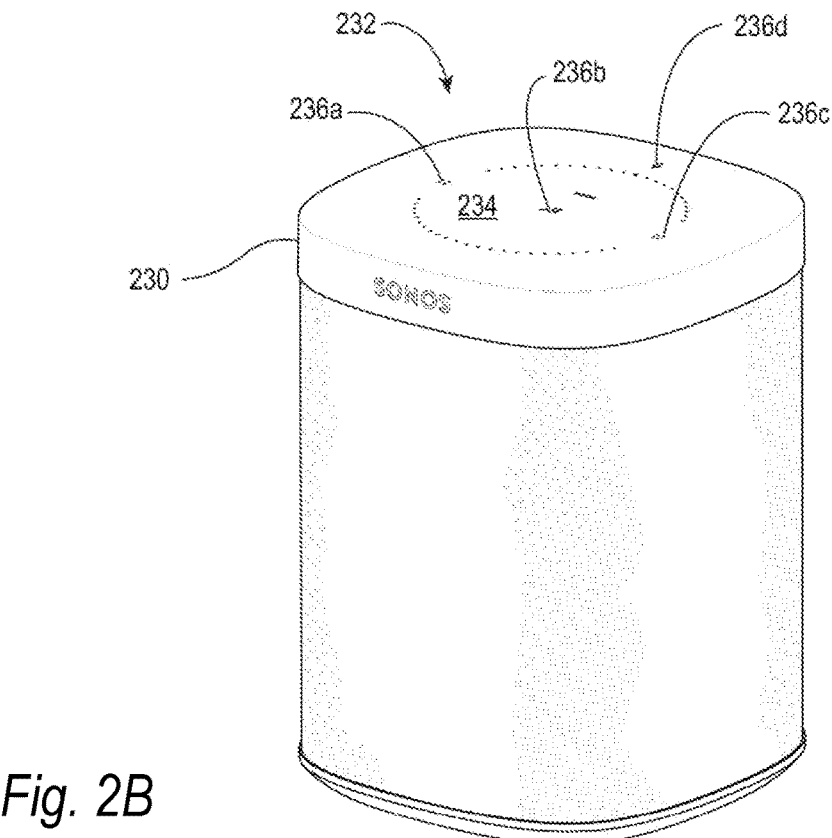
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
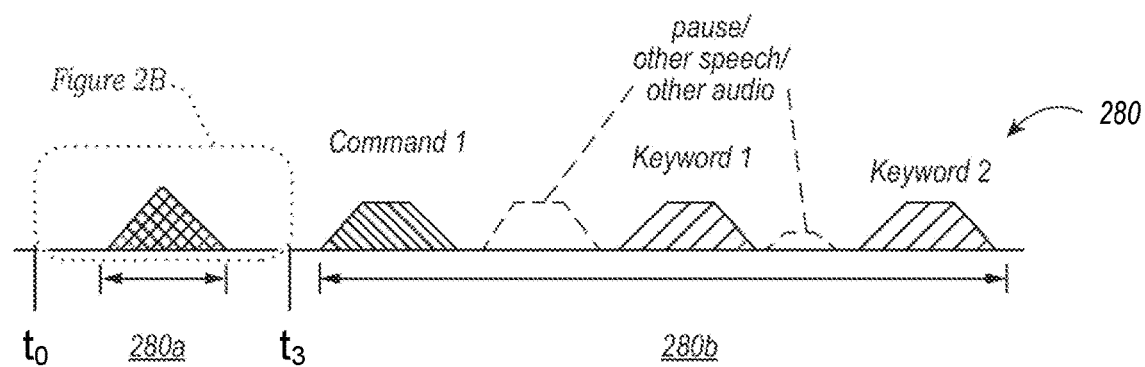
FIG. 2C is a diagram of an example voice input.

FIG. 2C is a diagram of an example voice input 280 that may be processed by an NMD or an NMD-equipped playback device. The voice input 280 may include a keyword portion 280a and an utterance portion 280b. The keyword portion 280a may include a wake word or a local keyword.

In the case of a wake word, the keyword portion 280a corresponds to detected sound that caused a VAS wake-word event. In practice, a wake word is typically a predetermined nonce word or phrase used to "wake up" an NMD and cause it to invoke a particular voice assistant service ("VAS") to interpret the intent of voice input in detected sound. For example, a user might speak the wake word "Alexa" to invoke the AMAZON® VAS, "Ok, Google" to invoke the GOOGLE® VAS, or "Hey, Ski" to invoke the APPLE® VAS, among other examples. In practice, a wake word may also be referred to as, for example, an activation-, trigger-, wakeup-word or -phrase, and may take the form of any suitable word, combination of words (e.g., a particular phrase), and/or some other audio cue.

The utterance portion 280b corresponds to detected sound that potentially comprises a user request following the keyword portion 280a. An utterance portion 280b can be processed to identify the presence of any words in detected-sound data by the NMD in response to the event caused by the keyword portion 280a. In various implementations, an underlying intent can be determined based on the words in the utterance portion 280b. In certain implementations, an underlying intent can also be based or at least partially based on certain words in the keyword portion 280a, such as when keyword portion includes a command keyword. In any case, the words may correspond to one or more commands, as well as a certain command and certain keywords.

A keyword in the voice utterance portion 280b may be, for example, a word identifying a particular device or group in the MPS 100. For instance, in the illustrated example, the keywords in the voice utterance portion 280b may be one or more words identifying one or more zones in which the music is to be played, such as the Living Room and the Dining Room (FIG. 1A). In some cases, the utterance portion 280b may include additional information, such as detected pauses (e.g., periods of non-speech) between words spoken by a user, as shown in FIG. 2C. The pauses may demarcate the locations of separate commands, keywords, or other information spoke by the user within the utterance portion 280b.

Based on certain command criteria, the NMD and/or a remote VAS may take actions as a result of identifying one or more commands in the voice input. Command criteria may be based on the inclusion of certain keywords within the voice input, among other possibilities. Additionally, state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280a. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
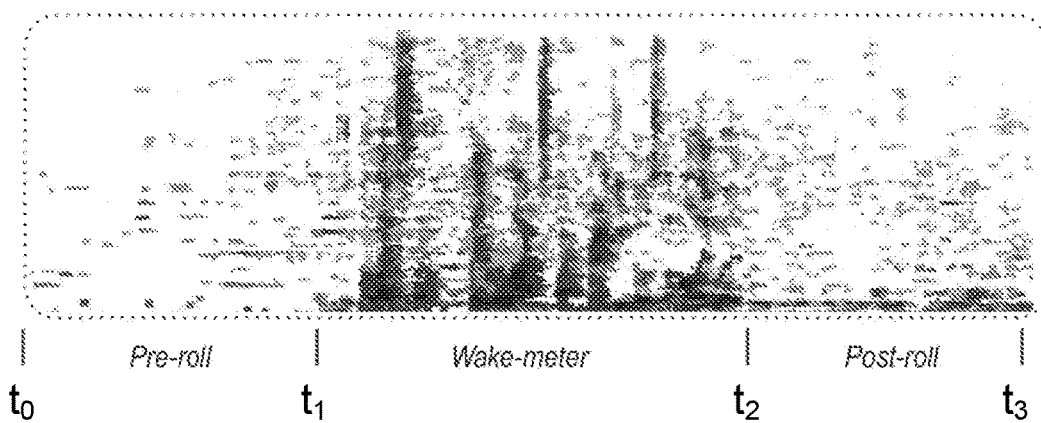
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280a of FIG. 2A. As illustrated, the example sound specimen comprises sound detected in an NMD's environment (i) immediately before a wake or command word was spoken, which may be referred to as a pre-roll portion (between times to and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection. Wake-word detection engines, by contrast, may be precisely tuned to identify a specific wake-word, and a downstream action of invoking a VAS (e.g., by targeting only nonce words in the voice input processed by the playback device).

ASR for local keyword detection may be tuned to accommodate a wide range of keywords (e.g., 5, 10, 100, 1,000, 10,000 keywords). Local keyword detection, in contrast to wake-word detection, may involve feeding ASR output to an onboard, local NLU which together with the ASR determine when local keyword events have occurred. In some implementations described below, the local NLU may determine an intent based on one or more keywords in the ASR output produced by a particular voice input. In these or other implementations, a playback device may act on a detected command keyword only when the playback devices determines that certain conditions have been met, such as environmental conditions (e.g., low background noise).

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540*a* and 540*b* shown in FIGS. 5A and 5B. Referring to FIGS. 5A and 5B together, the controller interfaces 540*a* and 540*b* includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
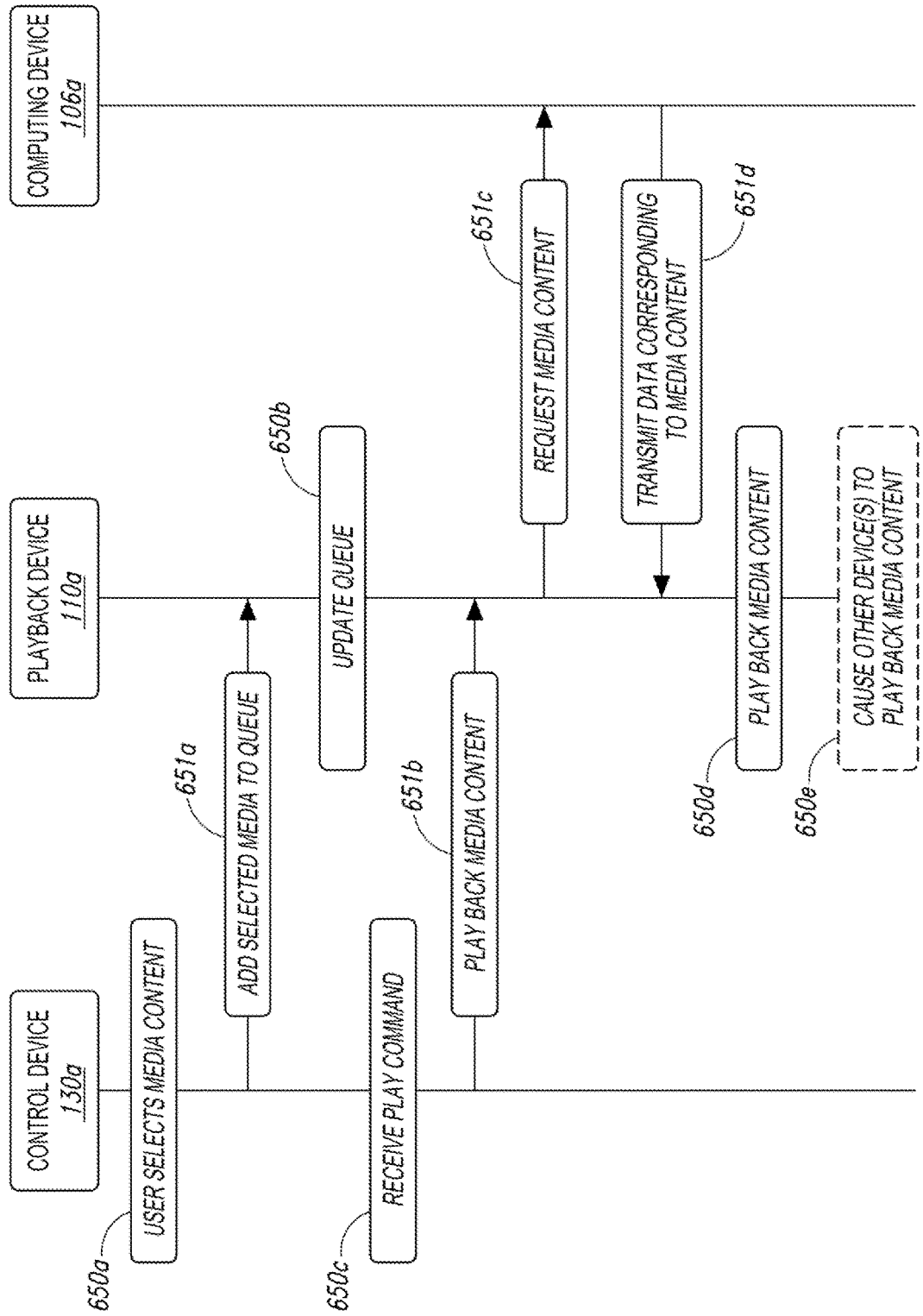
FIG. 6 is a message flow diagram of a media playback system.

FIG. 6 is a message flow diagram illustrating data exchanges between devices of the MPS 100. At step 650a, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651a to the playback device 102 (FIGS. 1A-1C) to add the selected media content to a playback queue on the playback device 102.

At step 650b, the playback device 102 receives the message 651a and adds the selected media content to the playback queue for play back.

At step 650c, the control device 104 receives input corresponding to a command to play back the selected media content. In response to receiving the input corresponding to the command to play back the selected media content, the control device 104 transmits a message 651b to the playback device 102 causing the playback device 102 to play back the selected media content. In response to receiving the message 651b, the playback device 102 transmits a message 651c to the computing device 106 requesting the selected media content. The computing device 106, in response to receiving the message 651c, transmits a message 651d comprising data (e.g., audio data, video data, a URL, a URI) corresponding to the requested media content.

At step 650d, the playback device 102 receives the message 651d with the data corresponding to the requested media content and plays back the associated media content.

At step 650e, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

Within examples, such messages may conform to one or more protocols or interfaces (e.g., an Application Programming Interface). A platform API may support one or more namespaces that include controllable resources (e.g., the playback devices 102 and features thereof). Various functions may modify the resources and thereby control actions on the playback devices 102. For instance, HTTP request methods such as GET and POST may request and modify various resources in a namespace. Example namespaces in a platform API include playback (including controllable resources for playback), playbackMetadata (including metadata resources related to playback), volume (including resources for volume control), playlist (including resources for queue management), and groupVolume (including resources for volume control of a synchrony group), among other examples. Among other examples, such messages may conform to a standard, such as universal-plug-and-play (uPnP).

III. Example Audio Playback Device Calibration

Examples described herein relate to calibration of audio playback devices in a media playback system, such as the playback devices 102 of the media playback system 100 (FIG. 1A). The playback devices 102 described herein may utilize various calibration procedures, which may calibrate the playback devices 102 using one or more calibration techniques. In some implementations, the media playback system 100 supports multiple types of calibration. For instance, different calibration procedures being used for different types of playback devices 102 (e.g., with different capabilities) or in different situations (e.g., with or without user involvement).

Figure 7A:
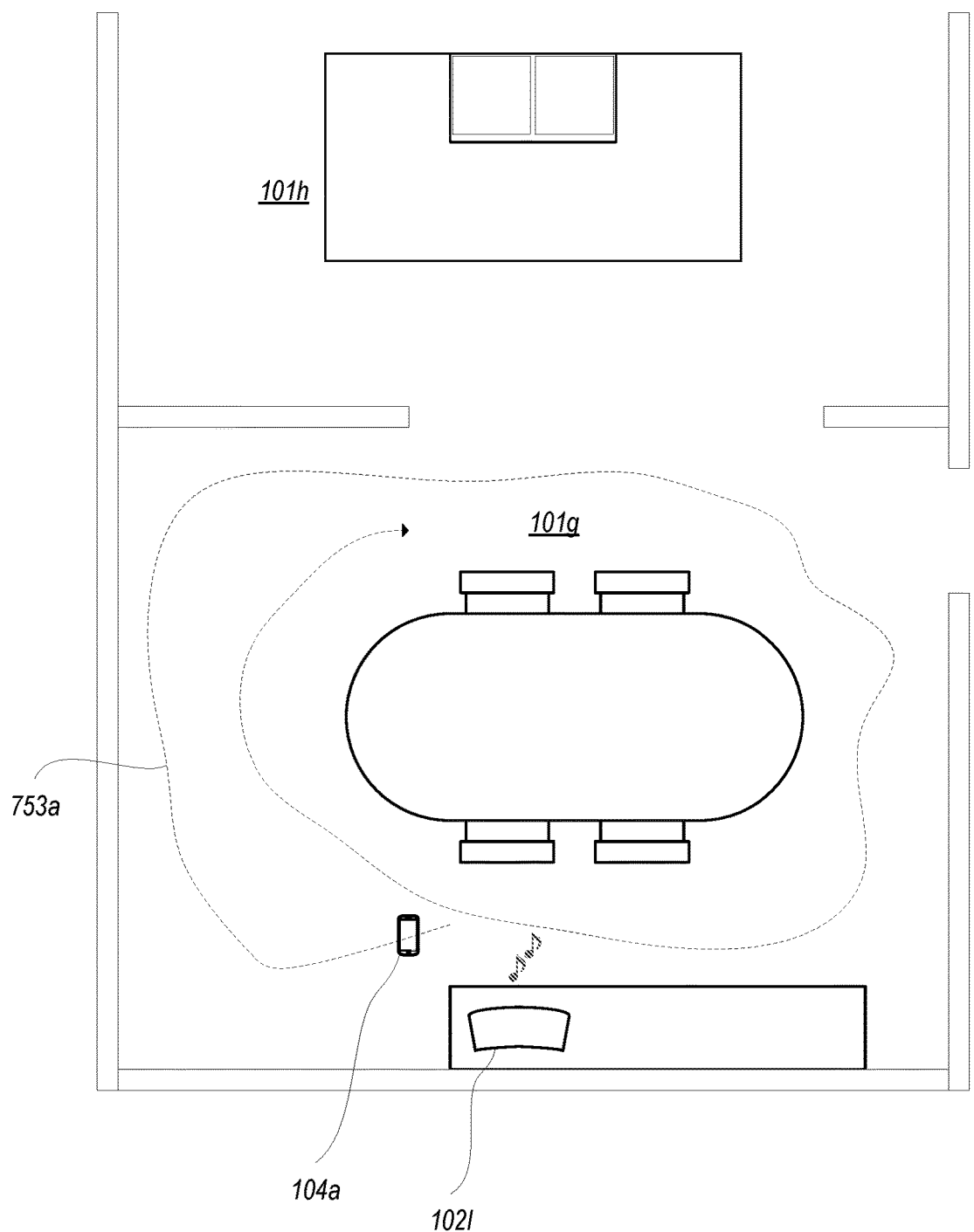
FIGS. 7A, 7B, and 7C are diagrams illustrating example calibration techniques in accordance with aspects of the disclosed technology.

FIG. 7A illustrates an example of a manual spectral calibration as performed in a listening area, which in this example is the Dining Room 101g (FIG. 1A). The example manual spectral calibration involves the control device 104a capturing audio played back by the playback device 102l via one or more microphones of the control device 104a (e.g., the microphones 422, as illustrated in FIG. 4). The control device 104a (or another device or devices) determines a spectral response of the playback device 102l in the Dining Room 101g based on the captured audio. The control device 104a may then determine a calibration profile (e.g., an equalization) that offsets (at least partially) the acoustic characteristics of the Dining Room 101g when applied to playback by the playback device 102l.

The manual spectral calibration is "manual" in that the procedure involves a user moving the control device 104a along a path 753a while capturing calibration sound(s) played back by the playback device 102l during the manual spectral calibration procedure. At various points along the path, the control device 104a captures samples of the calibration sound(s) at different locations, which may be combined to provide a more complete representation of the acoustic characteristics of the Dining Room 101g. The user may also move the control device 104a upwards and downwards while moving along the path 753a so as to capture samples of the calibration sounds at different heights in various positions along the path 753a. Further details of the manual spectral calibration are described in, for example, in U.S. Pat. No. 9,706,323, titled "Playback Device Calibration," which was previously incorporated by reference in its entirety.

In some example manual calibration procedures, the control device 104a may display prompts that guide the user to perform the "manual" aspects of the calibration procedure(s). For instance, the control device 104a may prompt a user to walk around the listening area (e.g., the Dining Room 101g) while carrying the control device 104a, thereby forming the path 753a. Additional details of user guidance during manual calibration procedures are described in, for example, in U.S. Pat. No. 10,372,406, titled "Calibration Interface," which is incorporated herein by reference in its entirety.

The calibration sound(s) output by the playback device(s) 102 during calibration may take different forms in various examples. In some examples, the playback devices 102 may output a specialized calibration sound that includes content across a calibration frequency range. For instance, the playback device 102l may output a hybrid test tone having a sweep portion and a noise portion. Additional details of calibration sounds that may be output during example calibration procedures are described in, for example, in U.S. Pat. No. 9,736,584, titled "Hybrid Test Tone For Space-Averaged Room Audio Calibration Using a Moving Microphone," which is incorporated herein by reference in its entirety. In other examples, the playback devices 102 may output user-selected content, such as music.

In some examples, example calibration procedures may calibrate multiple playback devices concurrently. For instance, a bonded zone of playback devices 102 in a stereo pair (FIG. 3B) or home theatre configuration (FIGS. 3C and 3D) may be calibrated concurrently. Such a calibration may enhance synchronous playback by the bonded playback devices 102.

Figure 7B:
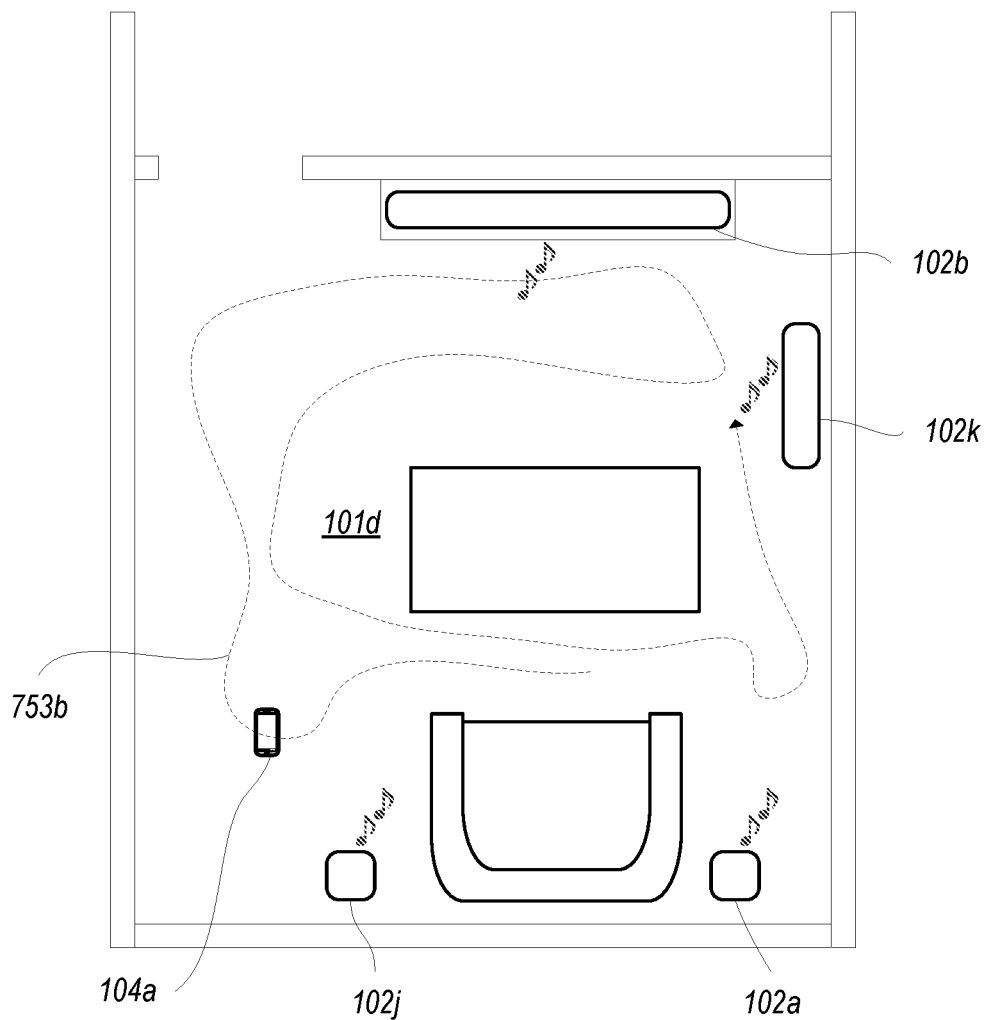

To illustrate, FIG. 7B illustrates an example of a manual spectral calibration of multiple playback devices 102 as performed in a listening area, which in this example is the Den 101d (FIG. 1A). The Den 101d zone includes the playback device 102a, the playback device 102b, the playback device 102j and the playback device 102k. Similar to the manual calibration procedure described in connection with FIG. 7A, the manual spectral calibration of the Den 101*d* zone involves the control device 104*a* capturing audio played back by the playback devices 102 via one or more microphones of the control device 104*a* (e.g., the microphones 422, as illustrated in FIG. 4). The control device 104*a* (or another device or devices) determines spectral responses of the multiple playback devices 102 in the Den 101*d* based on the captured audio. The control device 104*a* may then determine calibration profiles (e.g., equalizations) that offset (at least partially) the acoustic characteristics of the Dining Room 101*g* when applied to playback by the playback device 102*a*, the playback device 102*b*, the playback device 102*j* and/or the playback device 102*k*. Additional details regarding spatial calibration can be found, for example, in U.S. Pat. No. 9,794,710, titled "Spatial Audio Correction," which is incorporated by reference in its entirety.

To obtain individual spectral response for the multiple playback devices 102 in the Den 101*d*, the multiple playback devices 102 may stagger output of a calibration sound such that the multiple playback devices 102 output non-overlapping audio as the user moves the control device 104*a* along the path 753*b*. Such staggering of output permits the control device 104*a* to identify individual output by the playback device 102*a*, the playback device 102*b*, the playback device 102*j* and/or the playback device 102*k*. Respective samples from the playback devices 102 are then used to determine respective spectral responses for each of the playback devices 102. Additional details relating to concurrent calibration of multiple playback devices are described in, for example, in U.S. Pat. No. 9,648,422, titled "Concurrent Multi-Loudspeaker Calibration with a Single Measurement," which is incorporated herein by reference in its entirety.

In some examples, a playback device may include multiple, individually drivable audio transducers (i.e., speakers). In such examples, example calibration procedures may individually calibrate each audio transducer (or a set of two or more similarly driven transducers). For instance, two or more audio transducers may sum their output to form a sound axis, which may be calibrated similar to an individual playback device 102 or driver. Similar to multiple playback devices, during calibration, the individual (or sets of) audio transducers under calibration may stagger their output to facilitate capture of individual output from each arrangement. Additional details relating to concurrent calibration of multiple audio transducers are described in, for example, in U.S. Pat. No. 9,860,670, titled "Spectral Correction Using Spatial Calibration," which was incorporated herein by reference herein in its entirety.

With multiple playback devices 102 in a bonded zone or other grouping, sound from one playback device 102 (e.g., the playback device 102*b*) may arrive at a listener at a different time (e.g., later time) as compared with other playback devices 102 (e.g., the playback device 102*a* and/or the playback device 102*j*). As such, some example calibration procedures may additionally include a spatial calibration component. Such a spatial calibration component may offset differences in sound propagation time to a particular listening location.

Figure 7C:
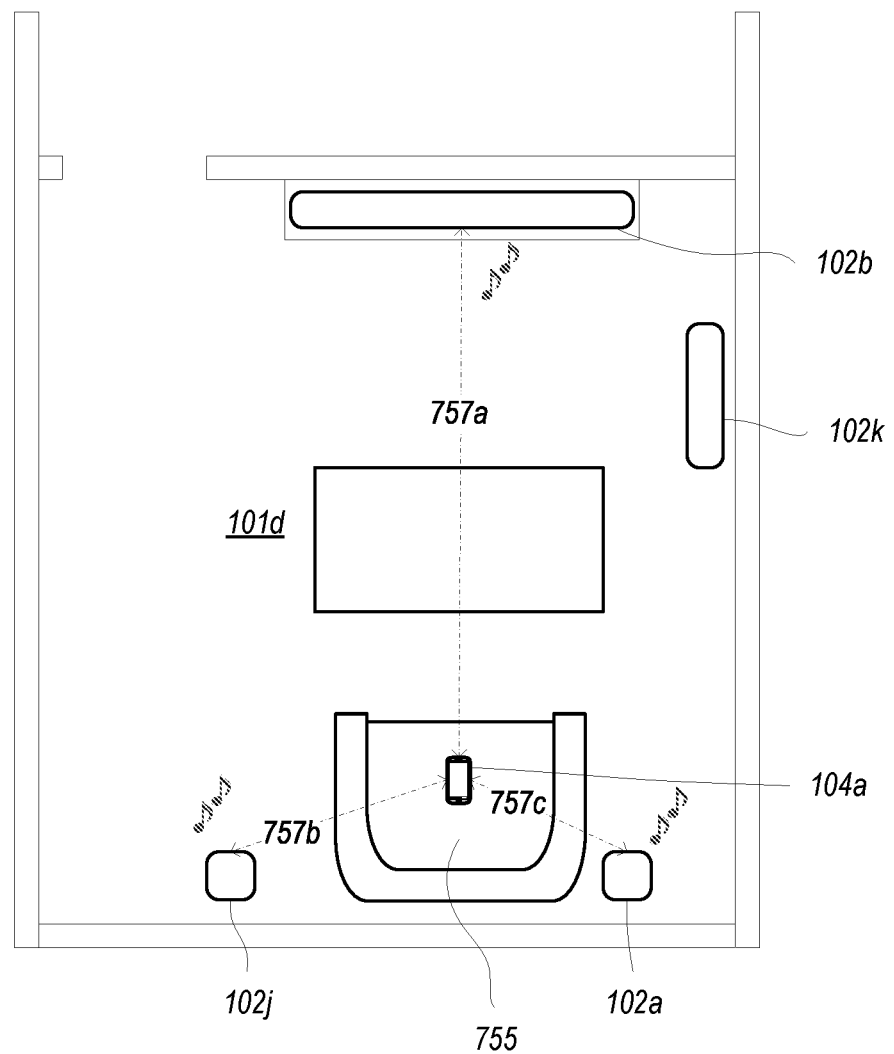

FIG. 7C illustrates a calibration procedure including a manual spatial calibration. During the manual spatial calibration, the user positions the control device 104*a* (and its microphones) at an intended listening location, represented here as a listening location 755. While at the listening location 755, the control device 104*a* may measure output from the playback device 102*b*, the playback device 102*a*, the playback device 102*j* and/or the playback device 102*k*, and then determine respective propagation times from each playback device 102 to the listening location 755 (e.g., along the sound propagation paths 757*a*, 757*b*, and 757*c*). The control device 104*a* (or a different device) may then determine a spatial calibration that (at least partially) offsets differences in propagation time from each playback device 102 in the Den 101*d* to the listening location 755.

Similar to the manual calibration procedure, the control device 104*a* may guide a user in performing such a manual spatial calibration. For instance, after guiding a user through a manual spectral calibration via one or more prompts, the control device 104*a* may guide the user through a manual spatial calibration using one or more additional prompts. Additional details of user guidance during manual calibration procedures are described in, for example, in U.S. Pat. No. 10,372,406, titled "Calibration Interface," which was previously incorporated herein by reference in its entirety.

Example calibration procedures may include both a spectral calibration (e.g., a spectral calibration component) and a spatial calibration (e.g., a spatial calibration component). That is, in addition to moving the control device 104*a* (and its microphones) along the path 753*b* during a manual spectral calibration component, the user may then position the control device 104*a* at the listening location 755 for a manual spatial calibration component. Such a calibration procedure would calibrate the playback devices 102 both spectrally and spatially for their respective positions in the Den 101*d*.

In some example calibration procedures, a spectral calibration may be performed first, and then applied by the playback devices 102 while performing a spatial calibration. Such a procedure may facilitate a calibration that includes both spatial and spectral correction. Examples regarding spatial calibration can be found, for example, in U.S. Pat. No. 9,860,670, titled "Spectral Correction Using Spatial Calibration," which was previously incorporated by reference herein in its entirety."

In addition to, or alternatively from, the manual calibration procedures described above, the playback devices 102 in the media playback system 100 may support self-calibration. In example self-calibration processes, a playback device 102 undergoing self-calibration may output calibration sound(s) and then capture its own output via one or more microphones. The playback device 102 may then determine its own self response.

Figure 8A:
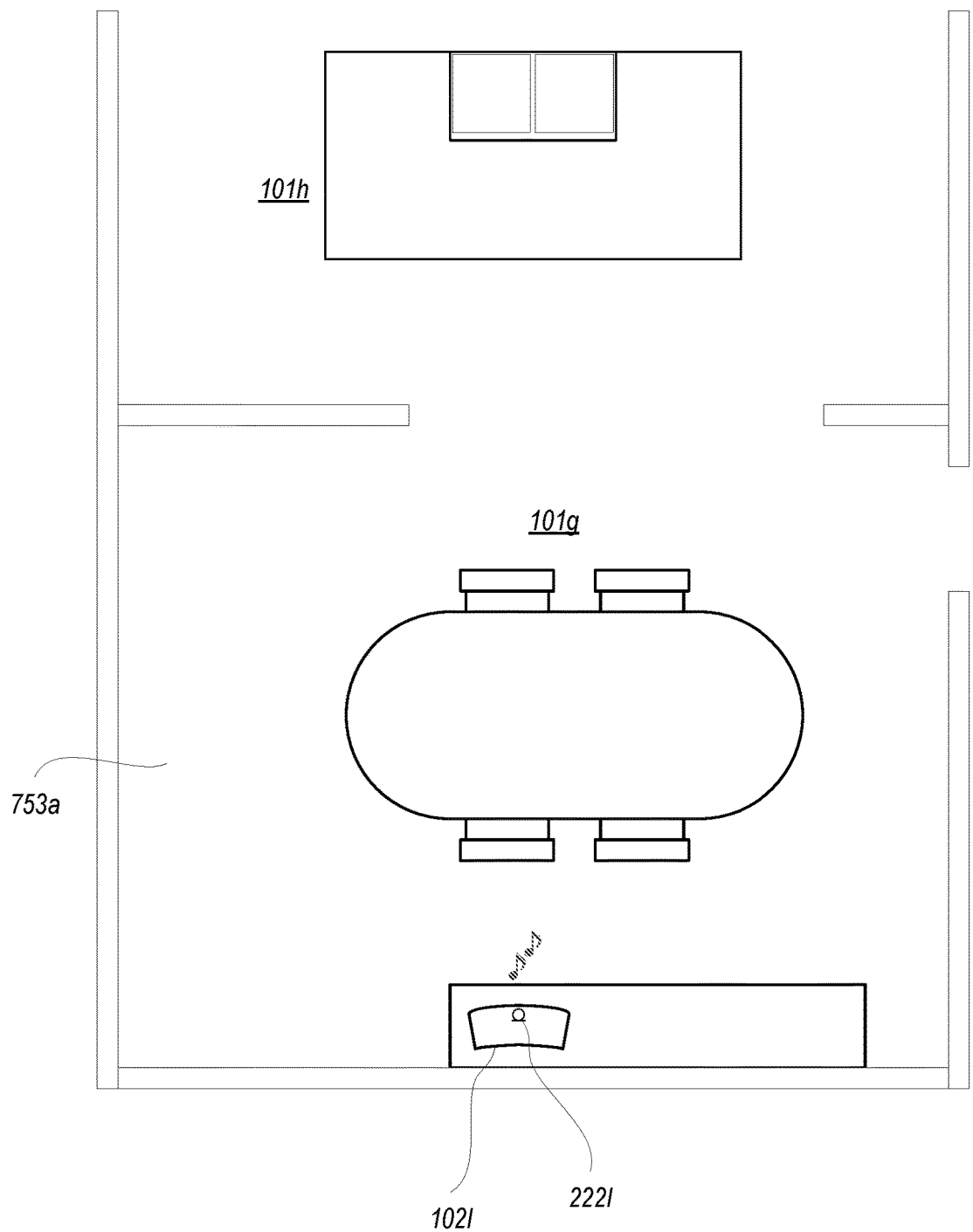
FIGS. 8A and 8B are diagrams illustrating example calibration techniques in accordance with aspects of the disclosed technology.

To illustrate, FIG. 8A illustrates a self-calibration procedure of the playback device 102*l* in the Dining Room 101*g*. The playback device 102*l* is shown as including one or more microphones 2221. As described in connection with FIG. 2A, example playback devices 102 may include one or more microphones 222, perhaps to facilitate voice control. During the self-calibration procedure, the playback device 102*l* captures its own playback via the one or more microphones 2221, and then determines its self-response in the Dining Room 101*g*.

After determining the self-response, the playback device 102*l* may identify a spectral calibration profile (e.g., an equalization) based on the self-response. In some examples, a mapping may be applied to the self-response to determine a second acoustic response representative of the listening area at a different location than that of the self-response. That is, the second acoustic response may be representative of an approximated acoustic response of the listening area as if it were measured from a generalized location or plurality of locations.

Within examples, such a mapping may be made via application of a transfer function, perhaps as generated via machine learning. To create such a mapping, a machine learning algorithm may have been trained on a large number (e.g., hundreds or thousands) of manual spectral calibration iterations in different listening areas. Unlike the manual calibration procedures, the determined response of the playback device 102*l* in the Dining Room 101*g* is not used to directly determine a calibration profile that offsets acoustic characteristics of the Dining Room 101*g*, but rather to find a previously determined calibration profile from manual calibrations in similar environments. Additional details regarding self-calibration can be found, for example, in U.S. Pat. No. 9,763,018, titled "Calibration of Audio Playback Devices," U.S. Pat. No. 10,299,061, titled "Playback Device Calibration," and U.S. Pat. No. 10,734,965, titled "Audio Calibration of a Portable Playback Device," which were previously incorporated by reference herein in their entirety.

In some examples, example self-calibration procedures utilize a portion of the voice input pipeline for capturing calibration sounds. A voice input pipeline, such as may be implemented in the voice processing 220 (FIG. 2A) may include processing steps such as acoustic echo cancellation to condition the captured audio. Additional details of audio capture using a voice input pipeline are described in, for example, in U.S. Pat. No. 10,299,061, titled "Playback Device Calibration," and U.S. Pat. No. 10,734,965, titled "Audio Calibration of a Portable Playback Device," which are each incorporated herein by reference in their entirety. In other examples, self-calibration procedures may utilize different microphones or not be configured to receive voice inputs.

Such self-calibration processes might not as consistently produce as accurate of a calibration as manual calibration procedures, but may be more convenient since such procedures do not necessarily involve a manual involvement by user. As such, portable playback devices 102 (which are typically more frequency re-positioned or re-oriented relative to wall-powered playback devices 102) may utilize such a self-calibration procedure to facilitate re-calibration (e.g., periodically or when the portable playback device is moved). Additional details regarding self-calibration of portable playback devices can be found, for example, in U.S. Pat. No. 10,299,061, titled "Playback Device Calibration," and U.S. Pat. No. 10,734,965, titled "Audio Calibration of a Portable Playback Device," which were previously incorporated by reference herein in their entirety.

Yet further, since self-calibration procedures do not require manual involvement by a user, wall-powered playback devices 102 may utilize self-calibration when a manual calibration is not available (e.g., because one has not been performed, or because the calibration is no longer valid because the playback device has been re-positioned or re-oriented). Then, a user may later perform a manual calibration procedure, which may supersede the self-calibration on the playback device 102. If the calibration profile determined via the self-calibration profile becomes no longer valid, then the playback device 102 may revert back to the self-calibration or perform a new self-calibration.

Some calibration procedures may involve both self-calibration and manual calibration components. For instance, a playback device 102 may utilize self-calibration for spectral calibration and a manual calibration for spatial calibration. Such calibration procedures allow for both spectral and spatial calibration with less user involvement as compared with a fully manual calibration procedure. Further, spectral calibrations may be limited to devices (e.g., control devices 104 and playback devices 102) have certain microphones with known acoustic characteristics, so that those characteristics can be accounted for in the calibration. Spatial calibrations may not be similarly limited, as the measurement of propagation delay is less affected by acoustic characteristics. As such, a calibration procedure involving both self-calibration and manual calibration components permits both spectral and spatial calibration using a wider variety of recording devices (for the spatial calibration component).

In some cases, some of the playback devices 102 in the media playback system 100 might not include a microphone. As such, these playback devices 102 might not be able to individually self-calibrate, as they are unable to record their own output without a microphone. In such cases, a player-to-player calibration procedure may in some cases be used to calibrate one or more non-microphone-enabled playback devices 102 with one or more microphone-enabled playback devices 102.

For instance, a bonded configuration that includes a non-microphone-enabled playback device 102 can be calibrated using a microphone-enabled playback device 102 (or vice-versa). In player-to-player calibration, non-microphone-enabled playback device(s) 102 play back a calibration sound while the microphone-enabled playback device 102 capture output of the non-microphone-enabled playback device(s). This captured output is used to calculate a spectral correction. The microphone-enabled playback device 102 may calibrate themselves (e.g., before calibrating the non-microphone-enabled playback device(s) 102) using the above-described self-calibration procedures.

Figure 9A:
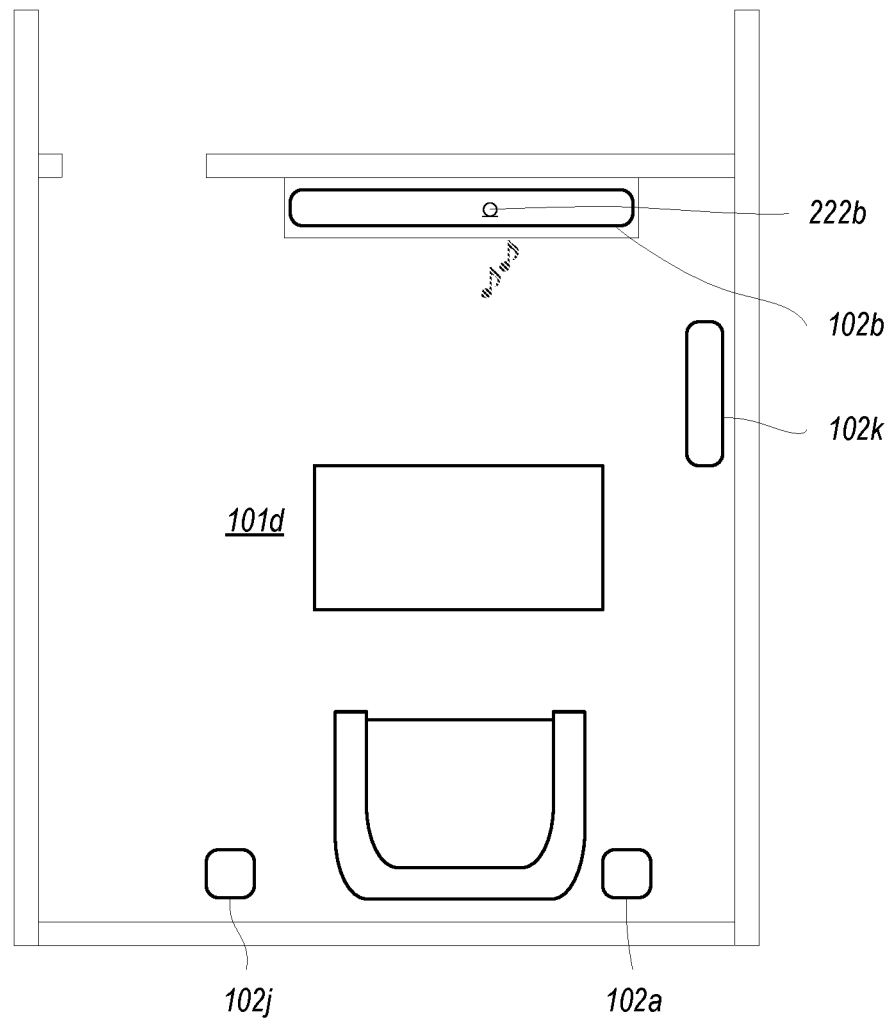
FIGS. 9A, 9B, and 9C are diagrams illustrating example calibration techniques in accordance with aspects of the disclosed technology.

For purposes of illustration, FIG. 9A illustrates a player-to-player calibration procedure of the playback device 102*a* and the playback device 102*j* in the Den 101*d*. As shown in FIG. 9A, the playback device 102*b* includes one or more microphones 222*b*, but in this example the playback device 102*a* and the playback device 102*j* exclude microphones. As such, the playback device 102*a* and the playback device 102*j* are unable to self-calibrate individually, but may self-calibrate via the playback device 102*b* as part of the bonded zone in the Den 101*d*.

During a player-to-player calibration of the playback device 102*a*, the playback device 102*b* captures the output of the playback device 102*a* via the one or more microphones 222*b*. The playback device 102*a* (or another device, such as the playback device 102*a*) determines the response of the playback device 102*a* in the Den 101*d*. After determining the self-response, the playback device 102*b* may identify a spectral calibration profile (e.g., an equalization) based on the determined response, similarly to identification of a spectral calibration profile based on a self-response. The playback device 102*b* may then instruct the playback device 102*a* to apply this spectral calibration profile (e.g., by sending instructions to the playback device 102*a* via the LAN 111).

In some examples, the playback device 102*b* may identify the calibration profile via a machine learning algorithm that maps the determined response to a particular calibration profile. To create such a mapping, the machine learning algorithm is trained on a large number of manual spectral calibration iterations in different listening areas. By using a large number of manual spectral calibration iterations (e.g., hundreds or thousands) in different listening areas, the machine learning algorithm becomes statistically capable of providing a calibration profile appropriate for the acoustic characteristics in the Den 101*d*, as represented by the determined response.

This player-to-player calibration process may be similarly performed for the playback device 102*j*, as well as other playback devices 102 in the bonded zone without a microphone (e.g., the playback device 102*k*). In further examples, example player-to-player calibration processes may be performed with any two or more playback devices 102 in the media playback system 100, provided that they are in audible range of one another (so as to facilitate capture of calibration sounds being output by the other device). For instance, a microphone-equipped playback device 102*l* in the Dining Room 101*g* (FIG. 1A) may calibrate a non-microphone-equipped playback device 102*i* in the Kitchen 101*h*, among other examples.

In alternative examples, the playback device 102*b* may determine the calibration profile based on the determined response. That is, similar to the manual calibrations, the playback device 102*b* may determine a calibration profile that offsets acoustic characteristics represented in the determined response, rather than using the determined response to identify a pre-determined calibration profile. Such a calibration might not as reliably offset acoustic characteristics within a listening area, as compared with a manual spectral calibration, given that example manual spectral calibrations may involve capturing sample output of the playback device 102 under calibration at multiple locations within the listen area (e.g., along a path, such as the paths 753). However, such a calibration may be desirable in certain circumstances, such as when a calibration profile based on a manual spectral calibration and/or a pre-determined calibration profile is not available.

Figure 9B:
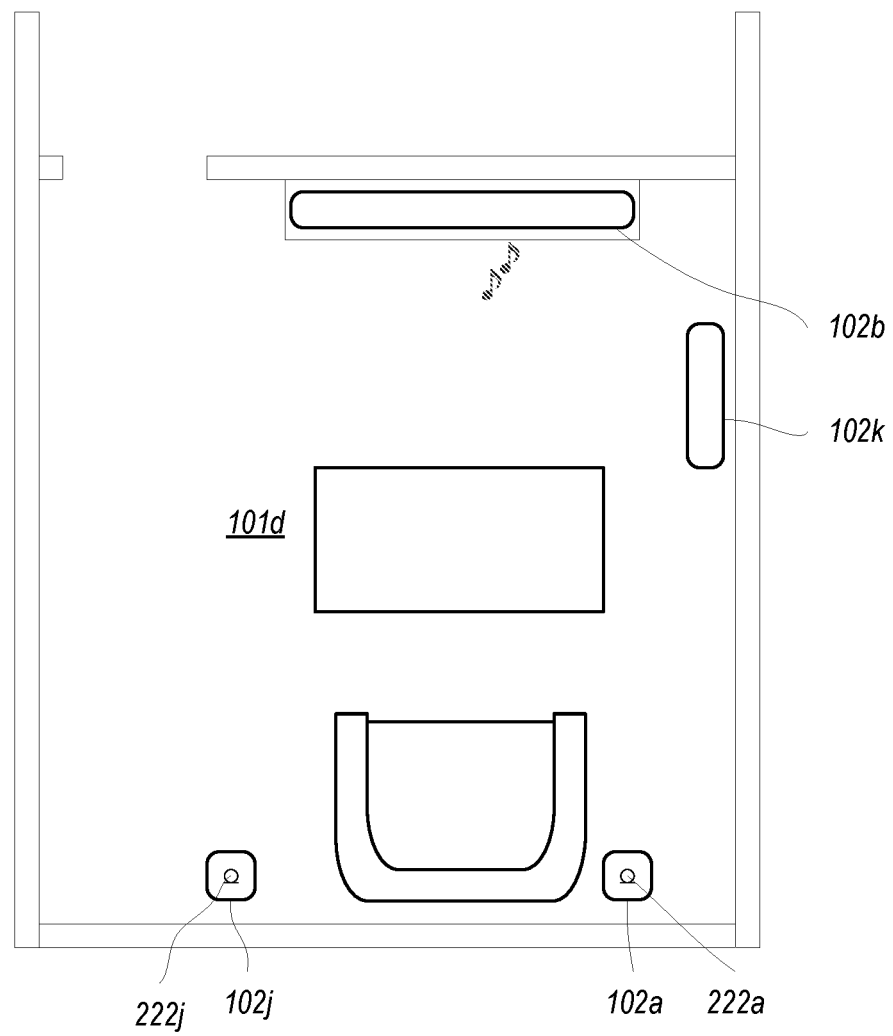

When there are multiple microphone-equipped playback devices 102 within audible range (e.g., in the same bonded group) of the playback device 102 under calibration, each playback device 102 may capture the output of the playback device 102 under calibration, thereby obtaining samples of its output from different positions. For instance, FIG. 9B illustrates a player-to-player calibration procedure of the playback device 102*b* in the Den 101*d*. As shown in FIG. 9B, the playback device 102*a* and the playback device 102*j* are equipped with microphone(s) 222*a* and microphone(s) 222*j*, respectively.

During example player-to-player calibration procedure, the playback device 102*a* and the playback device 102*j* may each capture playback of calibration sounds by the playback device 102*b*. Similar to the multiple samples along the path 753 in example manual spectral calibrations, samples from each device may be averaged or otherwise combined to provide a more complete representation of the response of the playback device 102*b* in the Den 101*d*. Such a representation may result in more reliable or accurate identification of a pre-determined calibration profile or determination of a calibration profile that more accurately offsets acoustic characteristics of the Den 101*d*.

Within example, certain home theatre bonded zone configurations may include one or more playback devices 102 configured to output additional surround channels and/or object-based content, such as DOLBY® TrueHD® height channels, DTS:HD channels, or DOLBY® ATMOS® objects, among other examples. Such playback devices 102 may include side- and/or -upward firing transducers to orient sound appropriately to sound format. During synchronous playback as part of a bonded zone, the playback devices 102 may output respective channels of the surround format or may coordinate in representing objects in an object-based format.

Figure 9C:
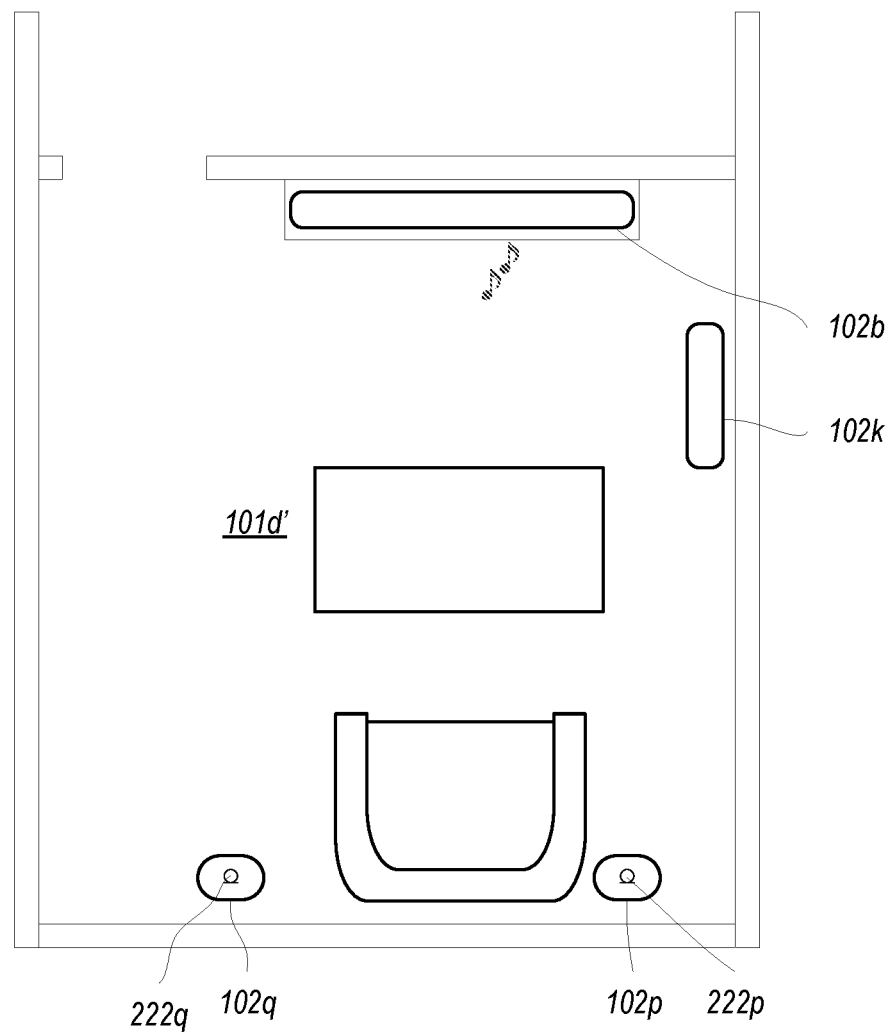

To illustrate, FIG. 9C includes a variation on the Den 101*d*, which is denoted as the Den 101*d'*. In this example, the playback device 102*a* and the playback device 102*j* have been replaced with a playback device 102*p* and a playback device 102*q*. The playback device 102*p* and a playback device 102*q* are equipped with respective side-firing transducers, a forward-firing transducer, and one or more upward firing transducers, which facilitates reproduction of surround or object-based formats, such as those noted above. For instance, the forward-firing and side-firing transducers may facilitate reproduction of direct and ambient sound, respectively, while the upward-firing transducer(s) facilitate reproduction of height channels and/or overhead objects.

As shown in FIG. 9C, the playback device 102*p* and the playback device 102*q* include one or more microphones 222*p* and one or more microphones 222*q*, respectively. These microphones may be used in example player-to-player calibration procedures in a similar manner as discussed with respect to FIGS. 9A and 9B. For instance, the playback device 102*p* and the playback device 102*q* may capture output of the playback device 102*b* and/or the playback device 102*k*, so as to facilitate calibration of those playback devices 102. Additionally, the playback device 102*p* and the playback device 102*q* may self-calibrate, or be calibrated using a manual calibration procedure, or via a combination of manual and self-calibration components, as discussed with respect to FIGS. 7A-9B.

IV. Example Multi-Chanel Acoustic Echo Cancellation

Figure 10A:
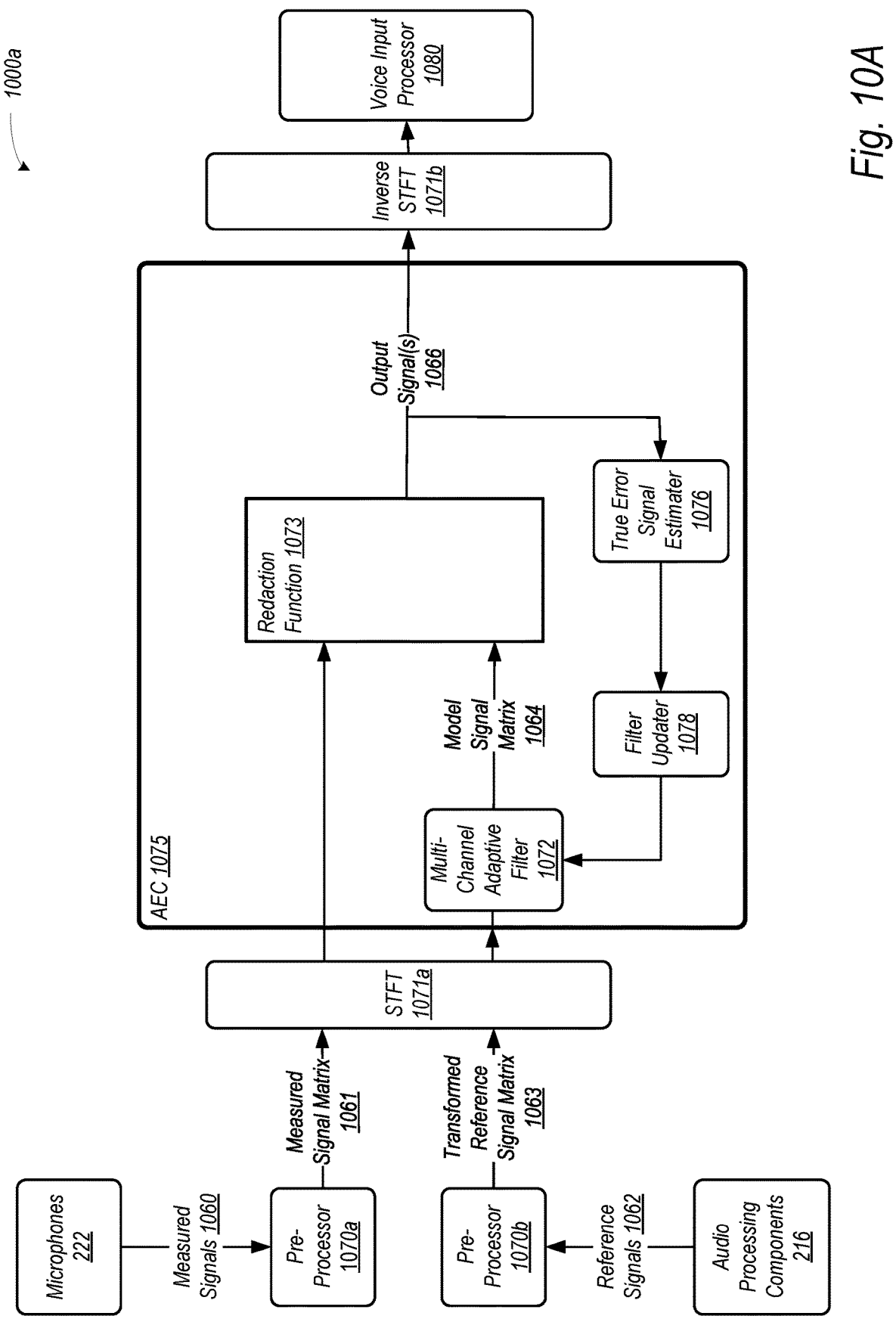
FIGS. 10A and 10B are block diagrams illustrating example acoustic echo cancellation techniques in accordance with aspects of the disclosed technology.

As discussed above, some embodiments described herein involve acoustic echo cancellation. FIG. 10A is a functional block diagram of an acoustic echo cancellation pipeline 1000*a* configured to be implemented within a playback device that includes a NMD, such as NMDs 103*a-e* (FIG. 1A). By way of example, the acoustic echo cancellation pipeline 1000*a* is described as being implemented within the playback device 102*a* of FIG. 1A. However, in other implementations, acoustic echo cancellation pipeline 1000*a* may be implemented in an NMD that is not necessarily a playback device (e.g., a device that doesn't include speakers, or includes relatively low-output speakers configured to provide audio feedback to voice inputs), such as the NMDs 103*f-g*.

In operation, the acoustic echo cancellation pipeline 1000*a* may be activated when the playback device 102*a* is playing back audio content. As noted above, acoustic echo cancellation can be used to remove acoustic echo (i.e., the sound of the audio playback and reflections and/or other acoustic artifacts from the acoustic environment) from the signal captured by microphone(s) of the networked microphone device. When effective, acoustic echo cancellation improves the signal-to-noise ratio of a voice input with respect to other sound within the acoustic environment. In some implementations, when audio playback is paused or otherwise idle, the acoustic echo cancellation pipeline 1000*a* is bypassed or otherwise disabled. Alternatively, the acoustic echo cancellation pipeline 1000*a* may, in some examples, remain active when audio playback is paused or otherwise idle.

As shown in FIG. 10A, the microphone array 222 (FIG. 2A) is configured to capture measured signals 1060, which are inputs to the acoustic echo cancellation pipeline 1000*a*. As described above in reference to FIGS. 2A-2D, the microphones 222 can be configured to capture audio within an acoustic environment in an attempt to detect voice inputs (e.g., wake-words and/or utterances) from one or more users. When the playback device 102*a* plays back audio content via speakers 218 (FIG. 2A), the microphone array 222 can capture audio that also includes audio signals representing sound produced by speakers 218 in playing back the audio content, as well as other sound being produced within the acoustic environment.

The pre-processor 1070a performs pre-processing of the measured signals in advance of acoustic echo cancellation. Pre-processing of the measured signals may involve analog-to-digital conversion of the measured signals. Other pre-processing may include sample rate conversion, de-jittering, de-interleaving, or filtering, among other examples. The pre-processor 1070a may also form the measured signals into a measured signal matrix 1061.

As shown in FIG. 10A, other inputs to the acoustic echo cancellation pipeline 1000a include reference signals 1062. The reference signals 1062 represent audio content being played back by the speakers 218 (FIG. 2A). As shown, the reference signals 1062 are routed from the audio processing components 216. Within examples, for calibration of p drivers, the reference signals 1062 may include signals representing p channels.

In an effort to closely represent the audio content being played back by the speakers 218, the reference signals may be taken from a point in an audio processing pipeline of the audio processing components 216 that closely represents the expected analog audio output of speakers 218. Since each stage of an audio processing pipeline may introduce artifacts, the point in the audio processing pipeline of the audio processing components 216 that closely represents the expected analog audio output of the speakers 218 is typically near the end of the pipeline. For instance, the reference signals 1062 may be received from the output of a digital-to-analog converter of the audio processing components 216, among other examples.

As noted above, although the acoustic echo cancellation pipeline 1000a is shown by way of example as being illustrated within the playback device 102a, the acoustic echo cancellation pipeline 1000a may alternatively be implemented within a dedicated NMD such as NMD 103f of FIG. 1A. In such examples, the reference signal may be sent from the playback device(s) that are playing back audio content to the NMD 103f, perhaps via a network interface or other communications interface, such as a line-in interface.

The pre-processor 1070b performs pre-processing of the reference signals 1062 in advance of acoustic echo cancellation. Pre-processing of the reference signal may also involve sample rate conversion, de-jittering, de-interleaving, time-delay, or filtering, among other examples. The pre-processor 1070b may also form the measured signals into a reference signal matrix. The reference signal matrix is also referred to herein using the mathematical symbol x.

Pre-processing the measured signals and the reference signals may ready the signals for mixing during acoustic echo cancellation. For instance, since audio content is output by the speakers 218 before the microphone array 222 captures a representation of that same content, time-delay may be introduced to the reference signals to time-align the measured and reference signals. Similarly, since the respective sample rates of analog-to-digital conversation of the analog microphone signals and the reference signals from the audio processing components 216 may be different, sample rate conversation of one or both of the signals may convert the signal(s) into the same or otherwise compatible sample rates. Other similar pre-processing may be performed by the pre-processor 1070a and the pre-processor 1070b to render the measured signals and reference signals compatible.

Pre-processing via the pre-processor 1070b may further include a transformation of the reference signal matrix into a transformed reference signal matrix 1063, which may reduce correlation among the reference signals. Typically, with many types of audio content, such as music or audio accompanying video, the reference signals 1062 are highly correlated, which can reduce the effectiveness of example acoustic echo cancellation algorithms. Applying certain transformations can retain the audio signals while reducing their correlation.

For instance, in some examples, the pre-processor 1070b may transform the reference signals 1062 (represented as a reference signal matrix X) via multiplication of the reference signal matrix X with a unitary transformation matrix U. The playback device 102a may determine the unitary transformation matrix U by performing singular value decomposition on the first L frames of the reference signals x (e.g., on the first few seconds of frames). In particular, a sample co-variance matrix $\hat{R}_{xx}[L]$ can be estimated as follows:

$$\hat{R}_{xx}[L] = \frac{1}{LR}\sum_{n=0}^{LR-1} x_l[n]x_l^T[n]$$

by way of illustration. Then, singular value decomposition is performed to obtain the unitary transform matrix U, which is expressed mathematically as:

$$\hat{R}_{xx}[L] = U_L \Sigma_L U_L^T$$

as an illustrative example. Once the unitary transform matrix U is determined, the transformed reference channels may be obtained via multiplication of the unitary transform matrix U with the reference signal matrix x. This can be expressed mathematically for frame 1 as:

$$\overline{X}^t[l] = X^t[l]U$$

for purpose of illustration.

Within examples, the unitary transformation matrix U can be updated using later frames in the measured signal matrix x under certain conditions, such as when the audio content changes. In particular, similarity between the first co-variance matrix and a second co-variance matrix calculated based on later frames is calculated (e.g., using matrix cosign similarity). When the similarity (or lack thereof) exceeds a tolerance threshold, the unitary transformation matrix U can be recalculated from the co-variance matrix in a similar manner as the initial co-variance matrix.

The acoustic echo cancellation pipeline 1000a also includes a short-time Fourier transformer 1071a, which converts the measured signal matrix 1061 and the transformed reference signal matrix 1063 into the short-time Fourier transform domain. Acoustic echo cancellation in the STFT domain may lessen the processing requirements of acoustic echo cancellation as compared with acoustic echo cancellation in other domains, such as the Frequency-Dependent Adaptive Filter ("FDAF") domain. As such, by processing in the STFT domain, additional techniques for acoustic echo cancellation may become more practical on devices with limited processing power (e.g., due to cost, size, or power constraints).

As those of ordinary skill in the art will appreciate, a STFT is a transform used to determine the sinusoidal frequency and phase content of local sections (referred to as "frames" or "blocks") of a signal as it changes over time. To compute a STFTs of the measured and reference signals, each signal is divided into a plurality of frames. In an example implementation, each frame is 16 milliseconds (ms) long. The number of samples in a 16 ms frame may vary based on the sample rate of the measured and reference signals.

Given a signal x(n), the signal is transformed to the STFT domain by:

$$X_l[m] = \sum_{n=0}^{N-1} x[n + mR]w_A[n]\omega_N^{kn}$$

where l is the frequency index, m is the frame index, N is the frame size, R is the frame shift size, $w_A[n]$ is an analysis window of size N, and $$\omega_N = \exp\left(-j\frac{2\pi}{N}\right).$$

Referring still to FIG. 10A, after being converted into the STFT domain, the measured signal matrix 1061 and transformed reference signal matrix 1063 are provided as input to an AEC 1075a, as shown. Acoustic echo cancellation as performed by the AEC 1075a on the measured signal is an iterative process. Each iteration of the AEC 1075a processes a respective frame of the measured signal matrix 1061 using a respective frame of the transformed reference signal matrix 1063. Such processing includes passing a frame of the transformed reference signal matrix 1063 through the multi-channel adaptive filter 1072 to yield frames of a model signal matrix 1064.

To cancel the acoustic echo from the measured signal matrix 1061, the measured signal matrix 1061 and the model signal matrix 1064 are provided to a redaction function 1073. Redaction function 1073 redacts the model signal matrix 1064 from the measured signal matrix 1061. Through such operation, the AEC 1075a cancels the estimated acoustic echo from the measured signal matrix 1061 yielding output signal(s) 1066. In some examples, the redaction function 1073 redacts the model signal matrix 1064 from the measured signal matrix 1061 by inverting the model signal matrix 1064 and mixing the inverted model signal matrix 1064 with a frame of the measured signal matrix 1061. In effect, this mixing removes the audio playback (the reference signals) from the measured signals, thereby cancelling the echo (i.e., the audio playback and associated acoustic effects) from the measured signal. Alternate implementations may use other techniques for redaction.

The acoustic echo cancellation pipeline 1000a also includes a short-time Fourier transformer 1071b, which converts the output signals 1066 back into the time domain. For instance, the short-time Fourier transformer 1071b may apply an inverse STFT. Mathematically, this can be expressed as:

$$x[n] = \sum_{l}\sum_{k=0}^{N-1} X_k[l]w_S[n - lR]\omega_N^{-k(n-lR)}$$

where $w_s[n]$ is a synthesis window.

After being converted back into the time domain, the output signals 1066 are provided to a voice input processor 1080. The voice input processor 1080 may perform wake-word detection, voice/speech conversion, and/or other processing. In some implementations, the voice input processor 1080 includes a local voice assistant, which is configured to perform processing of certain voice inputs locally on the playback device 102a. Alternatively, the voice input processor 1080 may send voice utterances (e.g., all voice utterance, or a subset that are unable to be processed locally) to a cloud-based voice assistant for processing.

Turning now in more detail to internal aspects of the AEC 1075a, as noted above, the transformed reference signal matrix in the STFT domain is passed through the multi-channel adaptive filter 1072. In operation, the AEC 1075a adapts the multi-channel adaptive filter 1072 during iterations of the AEC 1075a in an attempt to transform the transformed reference signal matrix 1063 into the measured signal matrix 1061 with diminishing error. Passing a frame of the transformed reference signal matrix 1063 through multi-channel adaptive filter 1072 yields a frame of the model signal matrix 1064. The model signal matrix 1064 represents estimates of the acoustic echoes of the reference signals 1062 (i.e., the audio that is being cancelled).

Within examples, the multi-channel adaptive filter 1072 implements multi-delay adaptive filtering. To illustrate example multi-delay adaptive filtering, let N be the multi-delay filter (MDF) block size, K be the number of blocks and $F_{2N}$ denote the 2N×2N Fourier transform matrix, and the frequency-domain signals for frame/are:

$$e(l)=F_{2N}[0_{1\times N},e(lN),\ldots,e(lN+N-1)]^T$$

$$X_k(l)=\text{diag}\{F_{2N}[x((l-k-1)N-1),\ldots,x(l-k+1)N-1)]^T\}$$

$$d(l)=F_{2N}[0_{1\times N},d(lN),\ldots,d(lN+N-1)]^T$$

where d(l) is the modeled signal, e(l) is the modeling error, and $X_k(l)$ is the measured signal. The MDF algorithm then becomes:

$$e(l) = d(l) - \hat{y}(l)$$

$$\hat{y}(l) = \sum_{k=0}^{K-1} G_1 X_k(l)\hat{h}_k(l-1)$$

with model update:

$$\forall k: \hat{h}_k(l)=\hat{h}_k(l-1)+G_2\mu_l(l)\nabla\hat{h}_k(l)$$

, and $$\nabla\hat{h}_k(l)=P_{X_kX_k}^{-1}(l)X_k^H(l)e(l)$$

$G_1$ and $G_2$ are matrices which select certain time-domain parts of the signal in the frequency domain:

$$G_1 = F_{2n}\begin{bmatrix} 0_{N\times N} & 0_{N\times N} \\ 0_{N\times N} & I_{N\times N} \end{bmatrix}F_{2N}^{-1},$$

and $$G_2 = F_{2n}\begin{bmatrix} I_{N\times N} & 0_{N\times N} \\ 0_{N\times N} & 0_{N\times N} \end{bmatrix}F_{2N}^{-1}$$

for purposes of illustration. The matrix $P_{X_kX_k}(l)=X_k^H(l)X_k(l)$ is a diagonal approximation of the input power spectral density matrix. To reduce the variance of the power spectrum estimate, the instantaneous power estimate may be substituted by its smoothed version, $$P_{X_kX_k}(l)=\beta P_{X_kX_k}(l-1)+(1-\beta)X_k^H(l)X_k(l)$$

where β is the smoothing term. This example also assumes a fixed step-size (how much the filter is adapted during each iteration) for each partition $\mu(m)=\mu_0 I$, however the step size may be varied in some implementations.

Example implementations of multi-channel adaptive filter 1072 implement cross-band filtering. To illustrate such filtering, let y[n] be the near-end measured (microphone) signal expressed as y[n]=d[n]+v[n], which includes the near-end speech and/or noise v[n] mixed with the acoustic echo $d[n]=\Sigma_{p-1}{}^P h_p[n]*x_p[n]$, where $h_p[n]$ is the impulse response of the system for channel p, $x_p[n]$ is the far-end reference signal of the channel p, and * is the convolution operator. Let $x_p{}^t$, $[l]=[x_p[lR], \ldots x_p[lR+N-1]]^T$ be the $l^{th}$ frame of the $p^{th}$ reference signal vector in time-domain where N is the length of the STFT window and R is the hop-size. The STFT of the reference signals 1062 is obtained by applying DFT as $x_p[l]=FW_A x_p{}^t[l]$ where F is the N×N DFT matrix and $W_A$ is a diagonal matrix with analysis window vector on its main diagonal.

Given the foregoing examples, in the STFT domain, the acoustic echo signal can be represented as:

$$d[l] = \sum_{p=1}^{P} \sum_{i=0}^{M-1} H_{i,p}[l] x_p[l-i]$$

where $d[l]=[D_0[l], \ldots, D_{N-1}[l]]^T$ is the DFT of the echo signal in frame l and M is the filter length in the multi-delay STFT domain multi-channel adaptive filter 1072 (denoted $H_{i,p}$). In particular, the multi-channel adaptive filter 1072 ($H_{i,p}$) is an N×N matrix representing the i-th acoustic impulse response matrix for channel p.

In operation, the AEC 1075a estimates the multi-channel adaptive filter 1072 ($H_{i,p}$) by estimating the echo in each iteration and calculating the error. The estimated echo is expressed as $$\hat{d}[l] = \sum_{p=1}^{P} \sum_{i=0}^{M-1} \hat{H}_{i,p}[l] x_p[l-i]$$

where $\hat{H}_{i,p}$ denotes the estimated adaptive filter. The error signal in the STFT domain is defined as:

$$e[l]=y[l]-\hat{d}[l]$$

which is decomposed as:

$$e[l]=v[l]+b[l]$$

where v[l] and $b[l] \triangleq d[l]-\hat{d}[l]$ are the noise vector and the noise-free error signal vector, respectively.

In the presence of near-end speech/noise, the error signal vector e[l] may deviate from the true, noise-free residual echo signal vector b[l]. Such deviation may cause filter adaptation to become unstable. To address this issue, the AEC 1075a may utilize a true error signal estimator 1076 and/or a filter updater 1078, among other examples.

The true error signal estimator 1076 attempts to recover the true residual echo signal from the error signal prior to the filter update. In some examples, the true error signal estimator 1076 may implement a non-linear clipping function which limits the error signal when its magnitude is above a certain threshold. For example, the non-linear clipping function can be expressed as $$\phi(E_m[l]) = \begin{cases} \frac{\sqrt{P_{e,m}[l]}}{|E_m[l]|} E_m[l], & |E_m[l]| \geq \sqrt{P_{e,m}[l]} \\ E_m[l], & \text{otherwise} \end{cases}$$

where $P_{e,m}$ denotes the power spectral density of the error signal and is defined as:

$$P_{e,m}[l] \triangleq \mathbb{E}\{|E_m[l]|^2\} \approx \alpha P_{e,m}[l-1]+(1-\alpha)|E_m[l]|^2$$

where α is a smoothing coefficient. This non-linear clipping function limits the error signal when its magnitude is above a certain threshold $\sqrt{P_{e,m}[l]}$. This non-linear clipping function is provided by way of example. Other functions may be implemented as well to estimate the true error signal.

The filter updater 1078 may adapt the step size to stabilize the filter update. When near-end noise/speech is present, the step-size is small to avoid divergence. When the acoustic impulse response matrices change and as a result the error signal increase, the step-size increases to increase the convergence rate. The adaptive step size can be expressed as:

$$\mu_{p,m,l}[l] = \mu \frac{1}{P_{\bar{x}_p,l}[l]} \times \frac{1}{1+\gamma \delta_{p,m,l}[l]}$$

where $\delta_{p,m,l}[l] \triangleq \frac{P_{e,m}^2[l]}{P_{\bar{x}_p,l}^2[l]}$ is the cross-frequency dependent regularization term and γ is a tuning parameter. $P_{\bar{x}_p,m}[l]$ is the power spectral density of the p-th transformed reference channel estimated as:

$$P_{\bar{x}_p,m}[l] \triangleq \mathbb{E}\{|\bar{X}_{p,m}[l]|^2\} \approx \alpha P_{\bar{x}_p,m}[l-1]+(1-\alpha)|\bar{X}_{p,m}[l]|^2$$

The cross-frequency dependent regularization term $\delta_{p,m,l}[l]$ is similar to the step-size of the normalized least mean square and a scaling term between 0 and 1. The scaling term automatically scales down the step-size when near-end noise/speech is present. Given the above defined adaptive step size, a noise-robust adaptive step-size matrix can be defined as:

$$(M_p[l])_{m+1,l+1}=\mu_{p,m,l}[l]$$

which can be referred to as the update filter.

The filter updater 1078 may then update the multi-channel adaptive filter 1072 as the sum of the multi-channel adaptive filter 1072 in the previous iteration and the update filter. This can be expressed mathematically as:

$$\hat{H}_{i,p}[l]=\hat{H}_{i,p}[l-1]+M_p[l] \circ (\phi(e[l]\bar{x}_p{}^H[l-i]))$$

for i=0, . . . , M−1. The a posteriori estimated echo can be expressed as:

$$\hat{d}_{post}[l] = \sum_{p=1}^{P} \sum_{i=0}^{M-1} \hat{H}_{i,p}[l] \hat{x}_p[l-1]$$

by way of illustration.

As shown above, ultimately, the update filter is summed with the multi-channel adaptive filter 1072 used in the current iteration of the AEC 1075a to yield the multi-channel adaptive filter 1072 for the next iteration of the AEC 1075a. Generally, during the first iterations of the AEC 1075a, some error exists in the cancellation of the echo from the measured signal. However, over successive iterations of the AEC 1075a, this error is diminished.

In the first iteration of the AEC 554, an initial filter is utilized, as no adaptation has yet occurred. In some implementations, the initial filter represents the acoustic coupling between speakers 218 and microphones 222. In some examples, the initial filter comprises a filter generated using measurements performed in an anechoic chamber. Such a generated filter represents an acoustic coupling between the speakers 218 and microphones 222 without any room effect, which could be used in any acoustic environment.

Alternatively, in an effort to start the multi-channel adaptive filter 1072 in a state that more closely matches the actual acoustic environment in which the playback device 102a is located, a filter representing an acoustic coupling between the speakers 218 and the microphones 222 may be determined during a calibration procedure that involves microphones 222 recording audio output by speakers 218 in a quiet room (e.g., with minimal noise). Other initial filters may be used as well, although a filter that poorly represents the acoustic coupling between the speakers 218 and the microphones 222 may provide a less optimal starting point for the AEC 1075a and result in additional iterations of the AEC 1075a before convergence.

As noted above, during each iteration of the AEC 1075a, the multi-channel adaptive filter 1072 is updated for the next iteration based on error from the current iteration. In this way, during successive iterations of the AEC 1075a, the AEC 1075a mathematically converges to a cancellation of the audio playback by the speakers 222 (FIG. 2). This convergence results in the multi-channel adaptive filter 1072 adapting during successive iterations to represent the acoustic echo response matrix for the i-th, p-th driver-to-mic channel.

Due to the transformation of the reference signals, the multi-channel adaptive filter 1072 does not represent the actual impulse response matrix for the driver channels after convergence. Instead, the multi-channel adaptive filter 1072 is a set of matrices representing respective equivalent impulse response matrix for the driver channels. As such, the multi-channel adaptive filter 1072 cannot be used directly to generate inputs to self-calibration as described in connection with FIGS. 8A-8B. However, in example implementations, the multi-channel adaptive filter 1072 can be used to estimate driver channel responses that can be used to generate inputs to self-calibration.

Figure 10B:
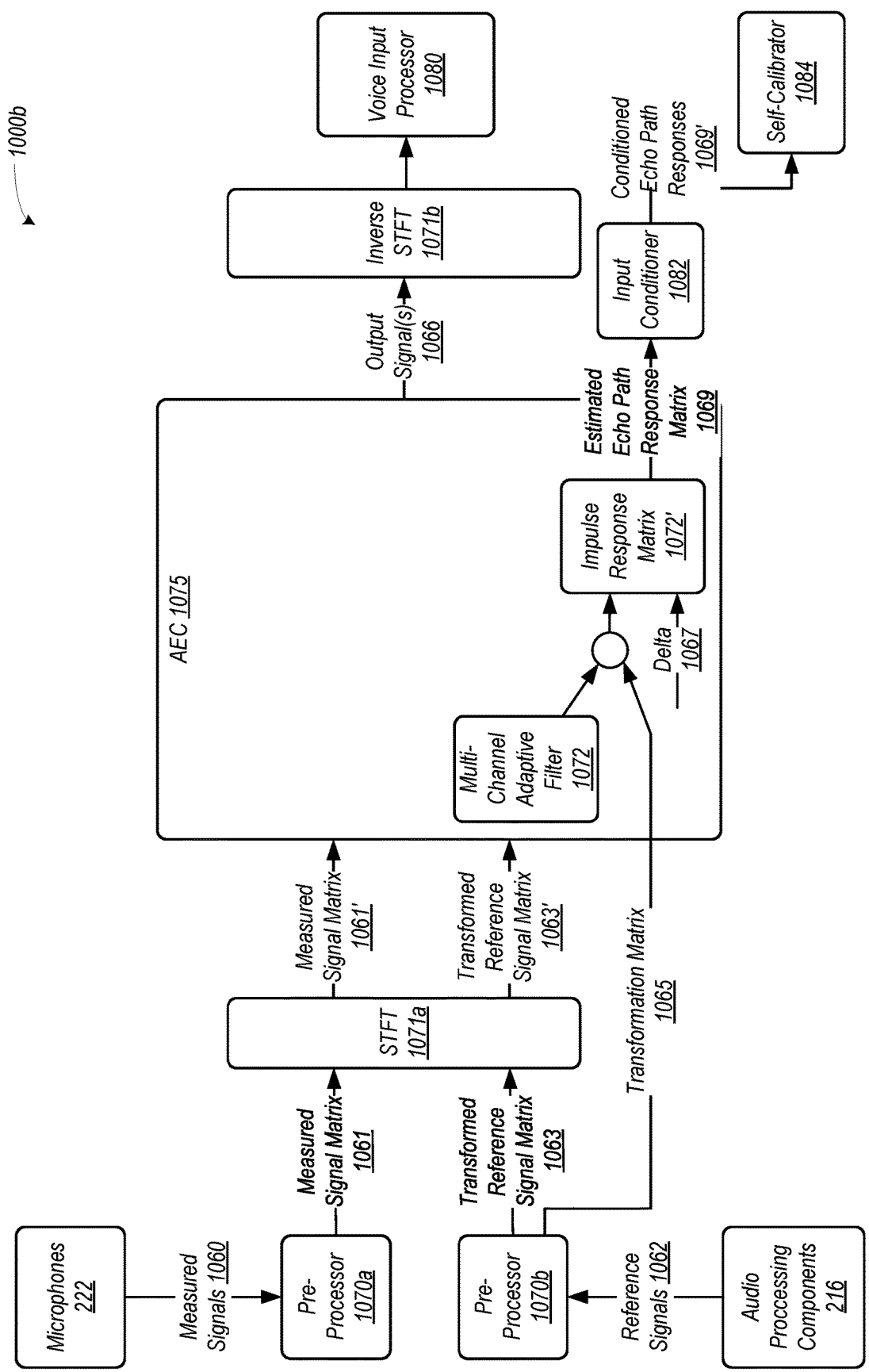

FIG. 10B is a functional block diagram of an acoustic echo cancellation pipeline 1000b. As shown, the acoustic echo cancellation pipeline 1000b includes some similar components as the acoustic echo cancellation pipeline 1000a, such as the pre-processors 1070a and 1070b, the STFTs 1071a and 1072b, and the voice input processor 1080. The acoustic echo cancellation pipeline 1000b may include other components of the acoustic echo cancellation pipeline 1000a that are not shown. Within examples, the acoustic echo cancellation pipeline 1000b may represent a variation on the acoustic echo cancellation pipeline 1000a.

Relative to the acoustic echo cancellation pipeline 1000a, the acoustic echo cancellation pipeline 1000b includes additional components to facilitate estimation of driver channel responses that can be used to generate inputs to self-calibration. In particular, the acoustic echo cancellation pipeline 1000b includes an AEC 1075b that is configured to facilitate such estimation. The AEC 1075b may be similar to the AECC 1075a but include additional functionality to facilitate the estimation of driver channel responses. In further examples, such functionality is fully or partially implemented using components other than the AEC 1075b. The AEC 1075a and the AEC 1075b are referred to collectively as an AEC 1075.

As shown in FIG. 10B, the AEC 1075b combines the transformation matrix 1065 (denoted mathematically as U) with the multi-channel adaptive filter 1072 ($\overline{H}$) to yield an impulse response matrix 1072' ($\hat{H}$). The impulse response matrix 1072' is an estimate of the actual acoustic impulse response matrix (rather than its equivalent, which is represented by the multi-channel adaptive filter 1072). This combination can be expressed mathematically as:

$$\hat{H}(l)=\overline{H}(l)U\otimes I_N$$

where $\otimes$ is the kronecker product operation and $I_N$ is an identify matrix of size N (i.e., the size of the multi-channel adaptive filter 1072). As discussed in connection with FIG. 10A, the transformation matrix 1065 (U) can be calculated by performing singular value decomposition on the reference signals 1062.

After the impulse response matrix 1072' ($\hat{H}$) is determined, the AEC 1075 may provide a delta signal 1067 (i.e., an impulse signal at 1 unit gain) to the impulse response matrix 1072' ($\hat{H}$) at a certain time frame i. The time frame i may be selected as a time frame when the multi-channel adaptive filter 1072 is converged, as the multi-channel adaptive filter 1072 typically will not represent the equivalent impulse response matrix for the driver channels. Convergence may be represented as frames that have an error signal below a certain threshold (i.e., near zero).

Yet further, since the presence of near-end speech/noise may interfere with acoustic echo cancellation, the playback device 102a may select the time frame i when near-end speech/noise is not detected. The playback device 102a may detect near-end speech/noise using any suitable components, such as the voice-processing components 220 described above in connection with FIG. 2. Other speech detection techniques may be implemented as well.

In examples where the multi-channel adaptive filter 1072 is implemented using multi-delay filtering, providing the delta signal 1067 to the to the impulse response matrix 1072' ($\hat{H}$) may yield impulse signals at a later time frame. For instance, if the multi-channel adaptive filter 1072 is implemented using a 6-tap FIR filter, the output will be 8*hopsize non-zero impulse signals that represent the estimated echo path responses for the driver channels. This output is representing in FIG. 10B as the estimated echo path response matrix 1069.

As described above, the AEC 1075 adapts the multi-channel adaptive filter 1072 over successive iterations to converge on a multi-channel adaptive filter 1072 that is capable of removing at least some of the acoustic echo from the measured signals 1060. When conditions in the environment change, the AEC 1075 may further adapt the multi-channel adaptive filter 1072 to cancel acoustic echo in the presence of these changed conditions. In some examples, when the multi-channel adaptive filter 1072 adapts, the AEC 1075b may update the impulse response matrix 1072' based on the adapted multi-channel adaptive filter 1072.

Yet further, example playback devices 102 might not need to consistently re-calibrate. Instead, practically, re-calibration periodically (e.g., every 30 seconds) and/or upon a trigger condition (e.g., a moved or re-positioned playback device 102) may be more practical and/or sufficient. As such, the playback device 102a might not need to update the impulse response matrix 1072' at the same rate as the multi-channel adaptive filter 1072.

Yet further, some types of content might not yield the best results. Highly correlated audio content might produce a less representative adaptive filter 1072 even after de-correlation of the reference signals. As such, the playback device 102 might not update the impulse response matrix 1072' when the reference signals 1062 are highly correlated.

In particular, the AEC 1075b may update the impulse response matrix 1072' over time only under certain conditions. For instance, the AEC 1075b may update the reference signal averaged coherence threshold is below a certain threshold. The playback device 102a may determine reference signal averaged coherence by determining respective coherences between each channel over all or a portion of the frequency range (e.g., 50-500) and then averaging the coherence to determine an averaged coherence.

As the reference signals change, the playback device 102a may re-determine the averaged coherence (e.g., on a frame-by-frame basis, or on some other frequency). When the averaged coherence is below the threshold (e.g., at frame i+j), the AEC 1075b updates the impulse response matrix 1072'. For other portions of the reference signal, the AEC 1075b may forego updating the impulse response matrix 1072' (e.g., at frame i+j+5). Yet further, updates to the impulse response matrix 1072' may be smoothed with a smoothing coefficient ($\alpha$).

Example self-calibration procedures, such as those discussed above in connection with FIGS. 8A-8B, may expect input data in a certain format. To condition the estimated echo path response matrix 1069, the acoustic echo cancellation pipeline 1000b includes an input conditioner 1082. The input conditioner 1082 may perform some signal conditioning on the estimated driver channel responses in order to get the data in the format expected by the input procedure.

Figure 8B:
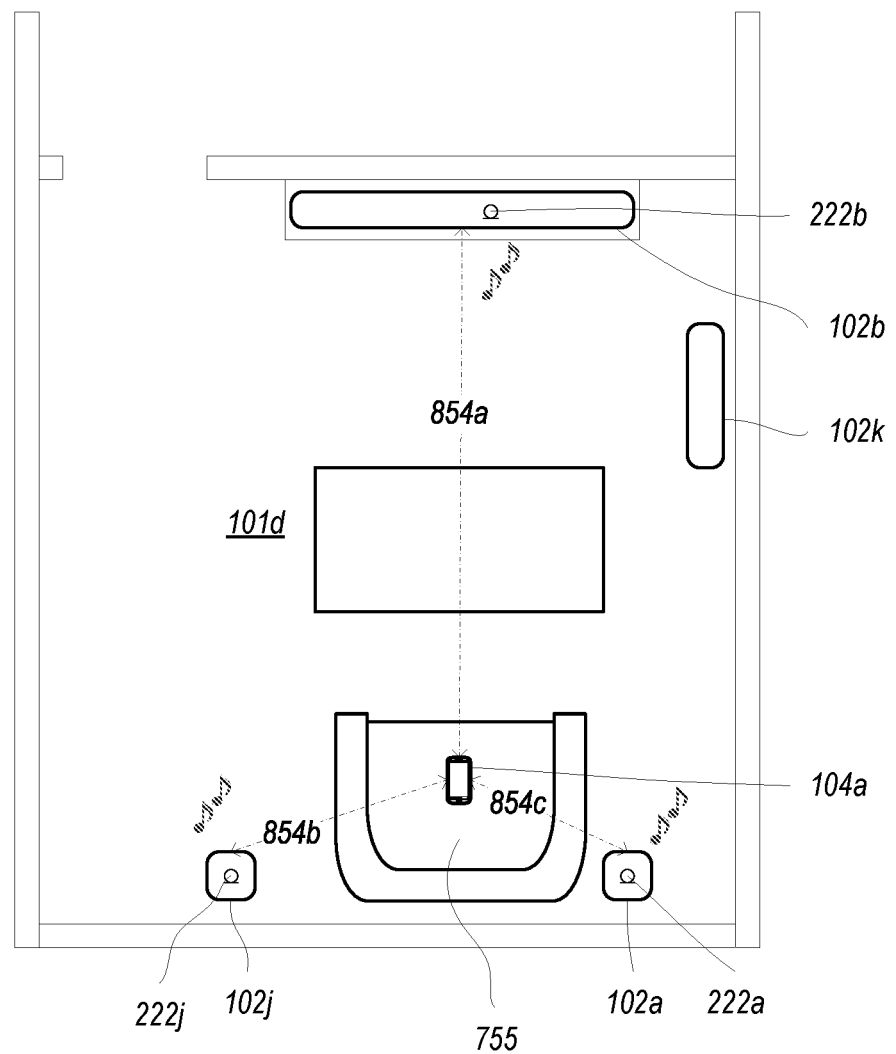

For instance, the self-calibrator 1084 may implement a self-calibration procedure (FIGS. 8A-8B). In an example, the self-calibrator 1084 expects 1/9 octave smoothed spectral coefficients of echo path responses. To get the data into the estimated echo path response matrix 1069, the input conditioner 1082 may apply smoothing and/or other signal conditioning to conform the estimated echo path response matrix 1069 to this format. The conditioned data is represented in FIG. 10B as the conditioned echo path responses 1069', which are provided to the self-calibrator 1084.

While self-calibration has been described for purposes of illustration, the example techniques may be utilized with other calibration procedures as well. Player-to-player calibration, as described in connection with FIGS. 9A-9C, may utilize, as inputs, responses extracted from the AEC 1075. For example, the playback device under calibration (e.g., the playback device 102b in FIG. 9B) may send data representing the reference signals to a microphone-equipped device (e.g., the microphone playback device 102j), perhaps as part of synchronous playback. The microphone-equipped device may implement the acoustic echo pipeline 1000a and/or the acoustic echo pipeline 1000b, which may be used to derive echo path responses.

V. Example Multi-Chanel System Identification Techniques

Figure 11:
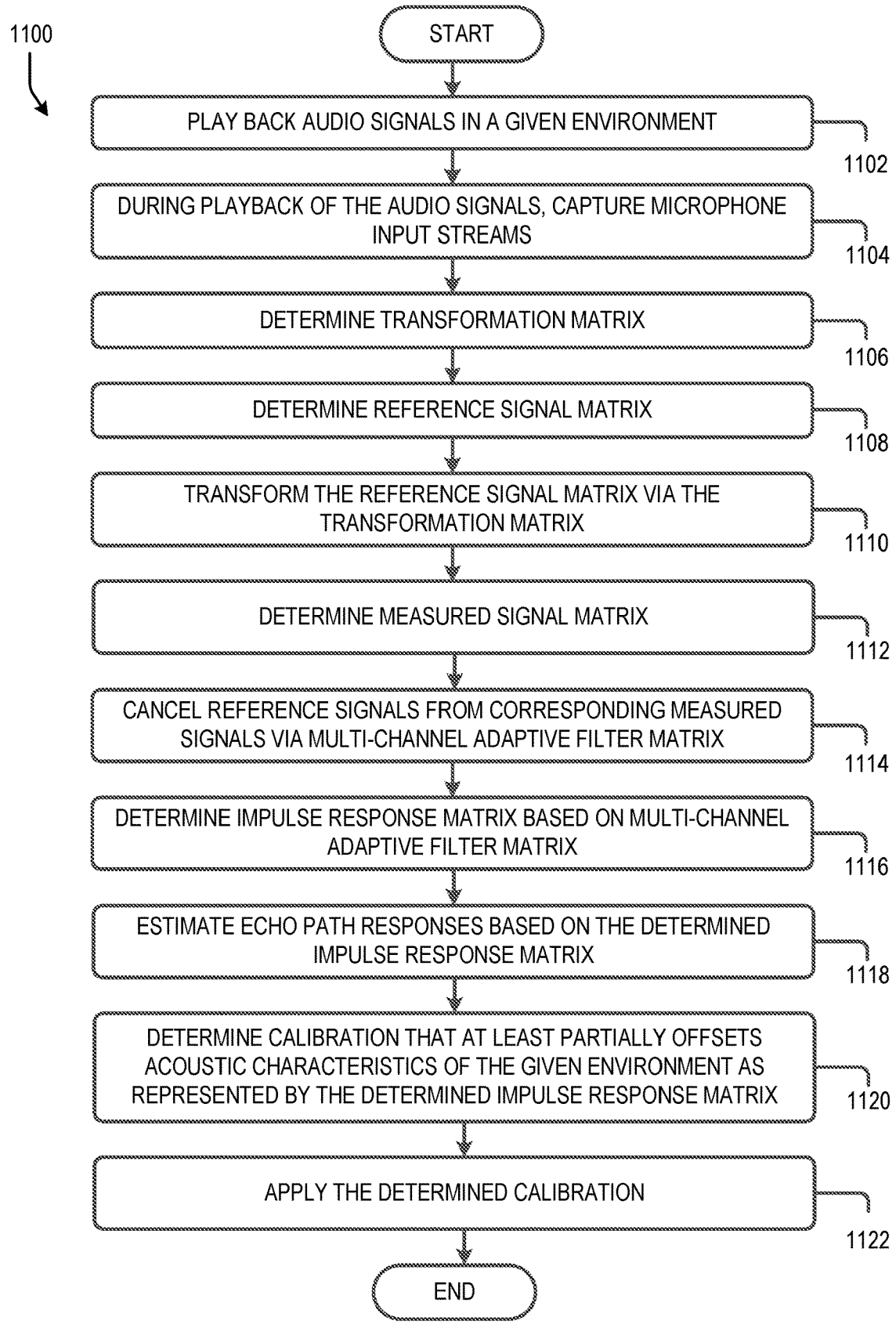
FIG. 11 is a flow diagram of an example method in accordance with aspects of the disclosed technology.

FIG. 11 is a flow diagram showing an example method 1100 to calibrate one or more playback devices. The method 1100 may be performed by a playback device 102 or a group of playback devices 102. Alternatively, the method 1000 may be performed by any suitable device or by a system of devices, such as the NMDs 103, control devices 104, computing devices 105, and/or computing devices 106.

Within examples, the method 1100 may involve a playback device 102 including microphone (i.e., a microphone-equipped playback device 102) and audio transducers (e.g., speakers). For the purposes of illustration, the method 1100 is described as being performed by the microphone-equipped playback device 102a, but certain examples are described with respect to other example devices, and many variations are contemplated with respect to example devices that are described herein or are otherwise suitable for the example techniques.

At block 1102, the method 1100 includes playing back audio signals in a given environment. For instance, the playback device 102a may play back two or more audio signals (e.g., stereo signals or surround sound audio signals) via audio transducers. The playback device may play back the audio signals via respective audio transducers. Alternatively, two or more audio transducers may play back the same audio signal. In further examples, output from two or more audio transducers may combine to output an audio signal.

Within examples, the playback device 102a may receive, via a network interface, data representing audio content. The playback device 102a may convert, via a digital-to-analog converter, the data to the respective audio signals for the audio transducers. The playback device 102a may then provide the respective audio signals from the digital-to-analog converter to an amplifier for playback via audio transducers, and also to a pre-processor (e.g., the pre-processor 1070b) as reference signals.

At block 1104, the method 1100 includes capturing microphone input streams. For example, the playback device 102a may capture, via microphones, respective microphone input streams during playback of the respective audio signals. In this matter, the playback device 102a may capture its own "self" sound. Alternatively, the playback device 102a may capture playback by another playback device, such as the playback device 102b (FIG. 9B). The captured microphone input streams may include data representing noise, speech, or other sound in the given environment in addition to the playback in the given environment.

At block 1006, the method 1000 includes determining a transformation matrix. For instance, the playback device 102a may determine a unitary transformation matrix for the respective audio signals via singular value decomposition, as discussed in connection with the pre-processor 1070b shown in FIGS. 10A and 10B. More particularly, in some examples, the pre-processor 1070b may perform singular value decomposition on certain first frames of the audio signals (e.g., the first three seconds).

At block 1108, the method 1100 includes determining a reference signal matrix. The reference signal matrix may include reference signals representing the respective audio signals in a short-time Fourier transform (STFT) domain. The playback device may transform the reference signals into the STFT domain using the STFT 1071a, as shown in FIGS. 10A and 10B, among other examples.

At block 1110, the method 1100 includes transforming the reference signal matrix via the transformation matrix. For example, the playback device 102a may transform the reference signal matrix via multiplication with the determined unitary transformation matrix, as described in connection with the pre-processor 1070b shown in FIGS. 10A and 10B. Such a transformation may at least partially decorrelate the respective audio signals.

At block 1112, the method 1100 includes determining a measured signal matrix. The measured signal matrix may include measured signals representing the microphone input streams in the STFT domain. The playback device may transform the reference signals into the STFT domain using the STFT 1071a, as shown in FIGS. 10A and 10B, among other examples.

At block 1114, the method 1100 includes cancelling, via a multi-channel acoustic echo canceller, at least a portion of the reference signals from the corresponding measured signals. For instance, the playback device 102a may cancel acoustic echo from the measured signals via the acoustic echo canceller 1075 which is described in connection with FIGS. 10A and 10B. The acoustic echo canceller 1075 may cancel acoustic echo using a multi-channel adaptive filter, such as the multi-channel adaptive filter 1072 shown in FIG. 1072.

Cancelling, via a multi-channel acoustic echo canceller, at least a portion of the reference signals from the corresponding measured signals may involving an iterative process. For example, during each $i^{th}$ iteration of a multi-channel acoustic echo canceller (e.g., the AEC 1075 in FIGS. 10A and 10B), the playback device 102a may determine $n^{th}$ frames of an model signal matrix (e.g., the model signal matrix 1064) by applying an $n-1^{th}$ frame of a multi-channel adaptive filter matrix (e.g., the multi-channel adaptive filter 1072) to the $n^{th}$ frames of the reference signal matrix (e.g., the transformed reference signal matrix 1063). The playback device may then cancel the model signal matrix 1064 from the measured signal matrix 1061 (e.g., via the redaction function 1073) to generate output signals (e.g., the output signals 1066).

Further, the playback device may update the multi-channel adaptive filter matrix based on error in the acoustic echo cancellation. For example, the playback device 102a may determine $n^{th}$ frames of an error signal matrix representing respective error between the model signal matrix (e.g., the model signal matrix 1064) and the measured signal matrix (e.g., the measured signal matrix 1061). The playback device 102a may then determine an $n^{th}$ frame of the multi-channel adaptive filter matrix based on the error.

In some examples, the playback device 102a may attempt to recover (i.e., estimate) the true error signal before updating the multi-channel adaptive filter matrix, possibly as described in connection with the true error signal estimator 1076 (FIG. 10A). For instance, before estimation of the $n^{th}$ frame of the multi-channel adaptive filter matrix, the playback device 102a apply an error recovery non-linearity function to the error signal matrix to estimate true error signals from the error signal matrix. In such examples, the $n^{th}$ frame of the multi-channel adaptive filter matrix is based on the estimated true error signals.

More particularly, the playback device 102a may update the multi-channel adaptive filter based on the error signal matrix and the transformed reference signal matrix. For instance, the multi-channel adaptive filter 1072 may be updated as a sum of (a) the $n-1^{th}$ frame of the multi-channel adaptive filter matrix 1072 and (b) a dot product of (i) an adaptive step-size matrix (e.g., as determined by the filter updated and (ii) a product of the error signal matrix and the transformed reference signal matrix. Further examples relating to such update are described in connection with the AEC 1075 shown in FIGS. 10A and 10B.

At block 1116, the method 1100 includes determine an impulse response matrix based on the multi-channel adaptive filter matrix. For instance, the playback device 102a may determine the impulse response matrix 1072' (FIG. 10B). As discussed in connection with FIG. 10B, the impulse response matrix 1072' may be determined as the product of (i) the multi-channel adaptive filter matrix and (ii) a Kronecker product of the unitary transform matrix and an identity matrix.

At block 1118, the method 1100 includes estimating echo path responses based on the determined impulse response matrix. For example, the playback device 102a may provide a signal (e.g., a delta signal of 1 unit gain) to the determined impulse response matrix, which produces output representing estimated echo path responses. For instance, the playback device 102a may provide the delta 1067 to the impulse matrix 1072' to generate the estimated echo path response matrix 1069.

In some examples, the playback device 102a may determine the impulse response matrix after the acoustic echo canceller 1075 converges. In other examples, the playback device 102a might not wait until convergence of the AEC 1075 but may instead update the impulse response matrix over time. In this way, some of the frames (e.g., those prior to convergence) might not as accurately represent the environment, but may come to better represent the environment over time as the AEC error is reduced.

As noted above, estimating echo path responses may involve updating the echo path responses over time as position of the playback device 102a or the environment changes (thereby causing updates to the multi-channel adaptive filter). During an update, the playback device 102a may update the determined impulse response matrix based on the current state of the multi-channel adaptive filter. The playback device 102a may then re-estimate the echo path responses based on the updated impulse response matrix.

In further examples, the playback device 102a may forego updates to the echo path responses when the reference signals have average coherence above a threshold. For instance, the playback device may determine that first frames of the reference signal matrix have an averaged coherence value that is above a threshold. Based on the determination, the playback device 102a may forego update of the estimated echo path responses based on the first frames.

To determine the average coherence values, the playback device 102a may determine respective coherence values between the $n^{th}$ frames of the reference signals in the reference signal matrix and average the respective coherence values across a particular frequency range. The particular frequency range may relate to the STFT window length and may be a sub-range of the entire output frequency range (e.g., 50-500 Hz). However, example calibration procedures may be able to utilize estimates covering such a sub-range as such estimates may be sufficient for system identification.

Conversely, when the reference signals have average coherence above the threshold, the playback device 102a may update the echo path responses, possibly with a smoothing coefficient. For example, the playback device 102a may determine that second frames of the reference signal matrix have an averaged coherence value that is below the threshold. Based on this determination, the playback device 102 may determine updates to the impulse response matrix based on states of the multi-channel adaptive filter matrix corresponding to the second frames and update the estimated echo path responses based on the updates to the impulse response matrix; based on the determination.

In further examples, the method 1100 may involve conditioning the estimated echo path responses to conform to an input specification of a self-calibrator. For instance, the playback device 102a may use the input conditioner to format the estimated echo path response matrix 1069 to a form expected by the self-calibrator 1084, as discussed in connection with FIG. 10B. Example conditioning includes octave smoothing of the estimated echo path responses.

At block 1120 the method 1100 includes determining a calibration that at least partially offsets acoustic characteristics of the given environment as represented by the estimated echo path responses. For instance, the self-calibrator 1084 (FIG. 10B) may utilize the estimated echo path responses as inputs to determine a calibration for the playback device 102a, perhaps as described in connection with any of the example self-calibration procedures described in section III, among other examples. Alternatively, the self-calibrator 1084 (FIG. 10B) may utilize the estimated echo path responses as inputs to determine a calibration for another playback device 102, perhaps as described in connection with any of the example player-to-player procedures described in section III, among other examples.

At block 1122, the method 1100 involves applying the calibration. For instance, the playback device 102a may apply the determined calibration to itself, such that its playback is modified by the calibration. Alternatively, the playback device 102a may cause another playback device 102 to apply the calibration, perhaps by sending data representing the calibration and/or instructions to the other playback device 102.

In further examples, the method 1000 involves processing a voice input represented in the measured signals. For instance, the playback device 102a may convert the STFT-domain output signals to time-domain output signals (e.g., via the STFT 1071b), and then cause a voice assistant to process the time-domain output signals (e.g., the voice input processor 1080). The voice assistant may be local (i.e., implemented on the playback device) or cloud-based, as described in section II.

Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method comprising: playing back respective audio signals via audio transducers in a given environment; during playback of the respective audio signals, capturing, via microphones, respective microphone input streams; determining, via singular value decomposition, a unitary transformation matrix for the respective audio signals; determining a reference signal matrix comprising reference signals representing the respective audio signals in a short-time Fourier transform (STFT) domain; transforming, via the determined unitary transformation matrix, the reference signal matrix to at least partially decorrelate the respective audio signals; determining a measured signal matrix comprising measured signals representing the microphone input streams in the STFT domain; cancelling, via a multi-channel adaptive filter matrix of a multi-channel acoustic echo canceller, at least a portion of the reference signals from the corresponding measured signals; determining an impulse response matrix as the product of (i) the multi-channel adaptive filter matrix and (ii) a Kronecker product of the unitary transform matrix and an identity matrix; estimating echo path responses based on the determined impulse response matrix; determining a calibration that at least partially offsets acoustic characteristics of the given environment as represented by the estimated echo path responses; and applying the determined calibration to a playback device.

Example 2: The method of Example 1, wherein estimating the echo path responses based on the determined impulse response matrix comprises: determining that first frames of the reference signal matrix have an averaged coherence value that is above a threshold; and based on the determination, foregoing update of the estimated echo path responses based on the first frames.

Example 3: The method of Example 2, wherein estimating the echo path responses based on the determined impulse response matrix comprises: determining that second frames of the reference signal matrix have an averaged coherence value that is below the threshold; determining updates to the impulse response matrix based on states of the multi-channel adaptive filter matrix corresponding to the second frames; updating the estimated echo path responses based on the updates to the impulse response matrix; based on the determination; and as the estimated echo path responses are updated, applying a smoothing function to the updates.

Example 4: The method of Example 2, wherein determining that the particular frames of the reference signal matrix have the averaged coherence value is above the threshold comprises determining respective coherence values between the $n^{th}$ frames of the reference signals in the reference signal matrix; and averaging the respective coherence values across a particular frequency range.

Example 5: The method of Example 4, wherein the particular frequency range is approximately 50-500 Hz.

Example 6: The method of any of Examples 1-5, wherein estimating the echo path responses based on the determined impulse response matrix comprises: providing a delta to the impulse response matrix to generate signals representing the estimated echo path responses; and conditioning the signals representing the estimated echo path responses to conform to an input specification of a self-calibrator, wherein determining the calibration comprises providing the conditioned signals estimated echo path responses to the self-calibrator; and determining, via the self-calibrator, the calibration.

Example 7: The method of Example 6, wherein conditioning the estimated echo path responses to conform to the input specification of the self-calibrator comprises applying octave smoothing to the estimated echo path responses.

Example 8: The method of Example 6, wherein determining the calibration comprises querying a dataset for particular stored acoustic responses that correspond to the estimated echo path responses, wherein the dataset relates a plurality of stored acoustic responses to respective calibrations.

Example 9: The method of Example 8: wherein the data storage comprises the dataset, and wherein the plurality of stored acoustic responses are determined based on multiple media playback systems each performing a respective acoustic room response determination process comprising (i) outputting, via a respective playback device within a respective environment that is not the same as the environment in which the playback device is located, respective audio content, (ii) while the respective playback device outputs the respective audio content, captures, via a first microphone disposed in a housing of the respective playback device, respective first audio data representing reflections of the respective audio content in the respective environment, (iii) captures, via a second microphone disposed in a housing of a respective mobile device, respective second audio data representing reflections of the respective audio content in the respective environment, (iv) based on the respective first audio data, determines an acoustic response of the respective environment, and (v) based on the respective second audio data, determines a calibration of the respective playback device in the respective environment.

Example 10: The method of Example 8, wherein a database comprises the dataset, and wherein querying the dataset for the particular stored acoustic response comprises sending, via the network interface to a server, a query of the database.

Example 11: The method of Example 8, wherein querying the dataset for the particular stored acoustic response comprises mapping the estimated echo path responses to the particular stored acoustic responses in the dataset that satisfy a threshold similarity to the estimated echo path responses.

Example 12: The method of any of Examples 1-11, wherein cancelling at least the portion of the reference signals from the corresponding measured signals comprises before estimation of the $n^{th}$ frame of the multi-channel adaptive filter matrix, applying an error recovery nonlinearity function to the error signal matrix to estimate true error signals from the error signal matrix, wherein the $n^{th}$ frame of the multi-channel adaptive filter matrix is based on the estimated true error signals.

Example 13: The method of any of Examples 1-12, further comprising: receiving, via the network interface, data representing audio content; and converting, via a digital-to-analog converter, the data to the respective audio signals for the audio transducers Example 14: The method of any of Examples 1-13, wherein the multi-channel acoustic echo canceller outputs STFT-domain output signals, and wherein the method further comprises: converting the STFT-domain output signals to time-domain output signals; and causing a voice assistant to process the time-domain output signals.

Example 15: The method of any of Examples 1-14, wherein cancelling at least the portion of the reference signals from the corresponding measured signals comprises during each $i^{th}$ iteration of the multi-channel acoustic echo canceller: (1) determining $n^{th}$ frames of a model signal matrix by applying an $n-1^{th}$ frame of a multi-channel adaptive filter matrix to the $n^{th}$ frames of the reference signal matrix; (2) determining $n^{th}$ frames of an error signal matrix representing respective error between the model signal matrix and the measured signal matrix; and (3) determining an $n^{th}$ frame of the multi-channel adaptive filter matrix as a sum of (a) the $n-1^{th}$ frame of the multi-channel adaptive filter matrix and (b) a dot product of (i) an adaptive step-size matrix and (ii) a product of the error signal matrix and the transformed reference signal matrix.

Example 16: A tangible, non-transitory, computer-readable medium having instructions stored thereon that are executable by one or more processors to cause a media playback system to perform the method of any one of Examples 1-15.

Example 17: A media playback system comprising a first playback device, the media playback system configured to perform the method of any one of Examples 1-15.

Example 18: A playback device comprising audio transducers, microphones, a network interface, at least one processor, and a data storage having instructions stored thereon that are executable by the at least one processor to cause the playback device to perform the method of any of Examples 1-15.

We claim:
1. A playback device comprising:
   audio transducers;
   microphones;
   a network interface;
   at least one processor; and
   a housing carrying the audio transducers, the microphones, the network interface, the at least one processor, and
   data storage including instructions that are executable by the at least one processor such that the playback device is configured to:
   play back respective audio signals via the audio transducers in a given environment;
   during playback of the respective audio signals, capture, via the microphones, respective microphone input streams;
   determine, via singular value decomposition, a unitary transformation matrix for the respective audio signals;
   determine a reference signal matrix comprising reference signals representing the respective audio signals in a short-time Fourier transform (STFT) domain;
   transform, via the determined unitary transformation matrix, the reference signal matrix to at least partially decorrelate the respective audio signals;
   determine a measured signal matrix comprising measured signals representing the microphone input streams in the STFT domain;

cancel, via a multi-channel adaptive filter matrix of a multi-channel acoustic echo canceller, at least a portion of the reference signals from the corresponding measured signals;

determine an impulse response matrix as the product of (i) the multi-channel adaptive filter matrix and (ii) a Kronecker product of the unitary transform matrix and an identity matrix;

estimate echo path responses based on the determined impulse response matrix;

determine a calibration that at least partially offsets acoustic characteristics of the given environment as represented by the estimated echo path responses; and apply the determined calibration to the playback device.

2. The playback device of claim 1, wherein the instructions that are executable by the at least one processor such that the playback device is configured to estimate the echo path responses based on the determined impulse response matrix comprise instructions the that are executable by the at least one processor such that the playback device is configured to:

determine that first frames of the reference signal matrix have an averaged coherence value that is above a threshold; and based on the determination, forego update of the estimated echo path responses based on the first frames.

3. The playback device of claim 2, wherein the instructions that are executable by the at least one processor such that the playback device is configured to estimate the echo path responses based on the determined impulse response matrix comprise instructions the that are executable by the at least one processor such that the playback device is configured to:

determine that second frames of the reference signal matrix have an averaged coherence value that is below the threshold;

determine updates to the impulse response matrix based on states of the multi-channel adaptive filter matrix corresponding to the second frames;

update the estimated echo path responses based on the updates to the impulse response matrix; based on the determination; and as the estimated echo path responses are updated, apply a smoothing function to the updates.

4. The playback device of claim 2, wherein the instructions that are executable by the at least one processor such that the playback device is configured to determine that the particular frames of the reference signal matrix have the averaged coherence value is above the threshold comprise instructions the that are executable by the at least one processor such that the playback device is configured to:

determine respective coherence values between the $n^{th}$ frames of the reference signals in the reference signal matrix; and average the respective coherence values across a particular frequency range.

5. The playback device of claim 4, wherein the particular frequency range is approximately 50-500 Hz.

6. The playback device of claim 1, wherein the instructions that are executable by the at least one processor such that the playback device is configured to estimate echo path responses based on the determined impulse response matrix further comprise instructions that are executable by the at least one processor such that the playback device is configured to:

provide a delta to the impulse response matrix to generate signals representing the estimated echo path responses;

condition the signals representing the estimated echo path responses to conform to an input specification of a self-calibrator, wherein the instructions that are executable by the at least one processor such that the playback device is configured to determine the calibration further comprise instructions the that are executable by the at least one processor such that the playback device is configured provide the conditioned signals estimated echo path responses to the self-calibrator; and determine, via the self-calibrator, the calibration.

7. The playback device of claim 6, wherein the instructions that are executable by the at least one processor such that the playback device is configured to condition the estimated echo path responses to conform to the input specification of the self-calibrator further comprise instructions the that are executable by the at least one processor such that the playback device is configured to:

apply octave smoothing to the estimated echo path responses.

8. The playback device of claim 6, wherein the instructions that are executable by the at least one processor such that the playback device is configured to determine the calibration further comprise instructions the that are executable by the at least one processor such that the playback device is configured to:

query a dataset for particular stored acoustic responses that correspond to the estimated echo path responses, wherein the dataset relates a plurality of stored acoustic responses to respective calibrations.

9. The playback device of claim 8, wherein the data storage comprises the dataset, and wherein the plurality of stored acoustic responses are determined based on multiple media playback systems each performing a respective acoustic room response determination process comprising (i) outputting, via a respective playback device within a respective environment that is not the same as the environment in which the playback device is located, respective audio content, (ii) while the respective playback device outputs the respective audio content, captures, via a first microphone disposed in a housing of the respective playback device, respective first audio data representing reflections of the respective audio content in the respective environment, (iii) captures, via a second microphone disposed in a housing of a respective mobile device, respective second audio data representing reflections of the respective audio content in the respective environment, (iv) based on the respective first audio data, determines an acoustic response of the respective environment, and (v) based on the respective second audio data, determines a calibration of the respective playback device in the respective environment.

10. The playback device of claim 8, wherein a database comprises the dataset, and wherein the instructions that are executable by the at least one processor such that the playback device is configured to query the dataset for the particular stored acoustic response comprise instructions that are executable by the at least one processor such that the playback device is configured to:

send, via the network interface to a server, a query of the database.

11. The playback device of claim 8, wherein the instructions that are executable by the at least one processor such that the playback device is configured to query the dataset for the particular stored acoustic response comprise instructions that are executable by the at least one processor such that the playback device is configured to:
map the estimated echo path responses to the particular stored acoustic responses in the dataset that satisfy a threshold similarity to the estimated echo path responses.

12. The playback device of claim 1, wherein the instructions that are executable by the at least one processor such that the playback device is configured to cancel at least the portion of the reference signals from the corresponding measured signals further comprise instructions the that are executable by the at least one processor such that the playback device is configured to:
before estimation of the $n^{th}$ frame of the multi-channel adaptive filter matrix, apply an error recovery non-linearity function to the error signal matrix to estimate true error signals from the error signal matrix, wherein the $n^{th}$ frame of the multi-channel adaptive filter matrix is based on the estimated true error signals.

13. The playback device of claim 1, wherein the playback device further comprises a digital-to-analog converter, and wherein the playback device further comprises instructions that are executable by the at least one processor such that the playback device is configured to:
receive, via the network interface, data representing audio content; and
convert, via the digital-to-analog converter, the data to the respective audio signals for the audio transducers.

14. The playback device of claim 1, wherein the multi-channel acoustic echo canceller outputs STFT-domain output signals, and wherein data storage further comprises instructions that are executable by the at least one processor such that the playback device is configured to:
convert the STFT-domain output signals to time-domain output signals; and
cause a voice assistant to process the time-domain output signals.

15. The playback device of claim 1, wherein the instructions that are executable by the at least one processor such that the playback device is configured to cancel at least the portion of the reference signals from the corresponding measured signals comprise instructions that are executable by the at least one processor such that the playback device is configured to:
during each $i^{th}$ iteration of the multi-channel acoustic echo canceller:
(1) determine $n^{th}$ frames of a model signal matrix by applying an $n-1^{th}$ frame of a multi-channel adaptive filter matrix to the $n^{th}$ frames of the reference signal matrix;
(2) determine $n^{th}$ frames of an error signal matrix representing respective error between the model signal matrix and the measured signal matrix; and
(3) determine an $n^{th}$ frame of the multi-channel adaptive filter matrix as a sum of (a) the $n-1^{th}$ frame of the multi-channel adaptive filter matrix and (b) a dot product of (i) an adaptive step-size matrix and (ii) a product of the error signal matrix and the transformed reference signal matrix.

16. A system comprising:
a playback device comprising audio transducers and microphones;
a network interface;
at least one processor; and
data storage including instructions that are executable by the at least one processor such that the system is configured to:
play back respective audio signals via the audio transducers in a given environment;
during playback of the respective audio signals, capture, via the microphones, respective microphone input streams;
determine, via singular value decomposition, a unitary transformation matrix for the respective audio signals;
determine a reference signal matrix comprising reference signals representing the respective audio signals in a short-time Fourier transform (STFT) domain;
transform, via the determined unitary transformation matrix, the reference signal matrix to at least partially decorrelate the respective audio signals;
determine a measured signal matrix comprising measured signals representing the microphone input streams in the STFT domain;
cancel, via a multi-channel adaptive filter matrix of a multi-channel acoustic echo canceller, at least a portion of the reference signals from the corresponding measured signals;
determine an impulse response matrix as the product of (i) the multi-channel adaptive filter matrix and (ii) a Kronecker product of the unitary transform matrix and an identity matrix;
estimate echo path responses based on the determined impulse response matrix;
determine a calibration that at least partially offsets acoustic characteristics of the given environment as represented by the estimated echo path responses; and
apply the determined calibration to the playback device.

17. The system of claim 16, wherein the instructions that are executable by the at least one processor such that the system is configured to estimate the echo path responses based on the determined impulse response matrix comprise instructions the that are executable by the at least one processor such that the system is configured to:
determine that first frames of the reference signal matrix have an averaged coherence value that is above a threshold; and
based on the determination, forego update of the estimated echo path responses based on the first frames.

18. The system of claim 17, wherein the instructions that are executable by the at least one processor such that the system is configured to estimate the echo path responses based on the determined impulse response matrix comprise instructions the that are executable by the at least one processor such that the system is configured to:
determine that second frames of the reference signal matrix have an averaged coherence value that is below the threshold;
determine updates to the impulse response matrix based on states of the multi-channel adaptive filter matrix corresponding to the second frames;
update the estimated echo path responses based on the updates to the impulse response matrix; based on the determination; and
as the estimated echo path responses are updated, apply a smoothing function to the updates.

19. The system of claim 17, wherein the instructions that are executable by the at least one processor such that the system is configured to determine that the particular frames of the reference signal matrix have the averaged coherence value is above the threshold comprise instructions the that are executable by the at least one processor such that the system is configured to:
  determine respective coherence values between the $n^{th}$ frames of the reference signals in the reference signal matrix; and
  average the respective coherence values across a particular frequency range.

20. A method comprising:
  playing back respective audio signals via audio transducers in a given environment;
  during playback of the respective audio signals, capturing, via microphones, respective microphone input streams;
  determining, via singular value decomposition, a unitary transformation matrix for the respective audio signals;
  determining a reference signal matrix comprising reference signals representing the respective audio signals in a short-time Fourier transform (STFT) domain;
  transforming, via the determined unitary transformation matrix, the reference signal matrix to at least partially decorrelate the respective audio signals;
  determining a measured signal matrix comprising measured signals representing the microphone input streams in the STFT domain;
  cancelling, via a multi-channel adaptive filter matrix of a multi-channel acoustic echo canceller, at least a portion of the reference signals from the corresponding measured signals;
  determining an impulse response matrix as the product of (i) the multi-channel adaptive filter matrix and (ii) a Kronecker product of the unitary transform matrix and an identity matrix;
  estimating echo path responses based on the determined impulse response matrix;
  determining a calibration that at least partially offsets acoustic characteristics of the given environment as represented by the estimated echo path responses; and
  applying the determined calibration to a playback device.

* * * * *

UNITED STATES PATENT AND TRADEMARK OFFICE
CERTIFICATE OF CORRECTION

PATENT NO. : 12,418,764 B2
APPLICATION NO. : 18/474909
DATED : September 16, 2025
INVENTOR(S) : Jin et al.

Page 1 of 2

It is certified that error appears in the above-identified patent and that said Letters Patent is hereby corrected as shown below:

In the Claims

In Column 47, in Claim 2, Line 21, delete "instructions the that" and insert -- instructions that --, therefor.

In Column 47, in Claim 3, Line 33, delete "instructions the that" and insert -- instructions that --, therefor.

In Column 47, in Claim 4, Line 52, delete "instructions the that" and insert -- instructions that --, therefor.

In Column 47, in Claim 6, Line 65, delete "instructions the that" and insert -- instructions that --, therefor.

In Column 48, in Claim 6, Line 8, delete "instructions the that" and insert -- instructions that --, therefor.

In Column 48, in Claim 7, Lines 19-20, delete "instructions the that" and insert -- instructions that --, therefor.

In Column 48, in Claim 8, Line 27, delete "instructions the that" and insert -- instructions that --, therefor.

In Column 49, in Claim 12, Line 11, delete "instructions the that" and insert -- instructions that --, therefor.

In Column 50, in Claim 17, Line 40, delete "instructions the that" and insert -- instructions that --, therefor.

Signed and Sealed this
Eleventh Day of November, 2025

John A. Squires
*Director of the United States Patent and Trademark Office*

CERTIFICATE OF CORRECTION (continued)
U.S. Pat. No. 12,418,764 B2

In Column 50, in Claim 18, Line 51, delete "instructions the that" and insert -- instructions that --, therefor.

In Column 51, in Claim 19, Line 1, delete "instructions the that" and insert -- instructions that --, therefor.